United States Patent
Hiraishi et al.

(10) Patent No.: US 6,917,396 B2
(45) Date of Patent: *Jul. 12, 2005

(54) LIGHT DIFFUSION FILM, PLANE LIGHT SOURCE DEVICE AND LIQUID CRYSTAL DISPLAY APPARATUS FOR ENHANCING A CONSTANT LUMINANCE AND DIFFUSING A LIGHT

(75) Inventors: Masanori Hiraishi, Osaka (JP); Masanari Ohnishi, Himeji (JP); Tomohiro Sasagawa, Tokyo (JP); Naoko Iwasaki, Tokyo (JP); Akimasa Yuuki, Tokyo (JP); Osamu Murakami, Tokyo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/343,415
(22) PCT Filed: May 30, 2002
(86) PCT No.: PCT/JP02/05313
§ 371 (c)(1),
(2), (4) Date: Mar. 28, 2003
(87) PCT Pub. No.: WO02/099474
PCT Pub. Date: Dec. 12, 2002

(65) Prior Publication Data
US 2003/0156238 A1 Aug. 21, 2003

(30) Foreign Application Priority Data
Jun. 1, 2001 (JP) .......... 2001-166127
Apr. 8, 2002 (JP) .......... 2002-105650
Apr. 8, 2002 (JP) .......... 2002-105651

(51) Int. Cl.$^7$ .......... G02F 1/1335; G02B 13/20; C09K 19/00
(52) U.S. Cl. .......... 349/64; 349/112; 359/599; 428/1.1
(58) Field of Search .......... 349/64, 112; 359/599; 428/1.1

(56) References Cited

U.S. PATENT DOCUMENTS

| | | | | |
|---|---|---|---|---|
| 5,889,570 A | * | 3/1999 | Mitsui et al. | 349/113 |
| 6,122,026 A | | 9/2000 | Takatani et al. | |
| 6,497,946 B1 | * | 12/2002 | Kretman et al. | 428/317.9 |
| 6,517,914 B1 | * | 2/2003 | Hiraishi | 428/1.1 |
| 6,738,112 B1 | * | 5/2004 | Sekiguchi | 349/63 |
| 2002/0140881 A1 | * | 10/2002 | Nakanishi et al. | 349/86 |
| 2002/0154260 A1 | * | 10/2002 | Uchida et al. | 349/112 |
| 2003/0002153 A1 | * | 1/2003 | Hiraishi et al. | 359/452 |
| 2003/0117707 A1 | * | 6/2003 | Uchida et al. | 359/492 |

FOREIGN PATENT DOCUMENTS

| | | |
|---|---|---|
| JP | 6-250269 A | 9/1994 |
| JP | 7-146404 A | 6/1995 |

(Continued)

*Primary Examiner*—Tarifur R. Chowdhury
(74) *Attorney, Agent, or Firm*—Birxh, Stewart, Kolasch & Birch, LLP

(57) ABSTRACT

A transmissive display apparatus comprises a liquid crystal display unit; and a plane light source unit that comprises a tubular light source, a light guide, and a light-diffusing film having anisotropy that provides a consistent luminance in a display surface, and/or ultraviolet (UV) absorbability that absorbs the UV from the light source and prevents deterioration of a prism sheet in the display unit and liquid display cell. In the film, a light-scattering characteristic $F(\theta)$ represents a relationship between the light-scattering angle $\theta$ and a scattered light intensity F fulfills $Fy(\theta)/Fx(\theta) \geq 1.01$ over a range of $\theta = 4$ to $30°$, wherein $Fx(\theta)$ and $Fy(\theta)$ represent the light-scattering characteristics in an X-axial direction and Y-axial direction of the film, respectively. The film comprises a light-diffusing layer composed of a plurality of resins which are different from each other in refractive index, and a transparent layer laminated on at least one side thereof.

24 Claims, 4 Drawing Sheets

FOREIGN PATENT DOCUMENTS

| | | | |
|---|---|---|---|
| JP | 07-174908 | * | 7/1995 |
| JP | 9-160027 A | | 6/1997 |
| JP | 10-268301 A | | 10/1998 |
| JP | 11-002706 | * | 6/1999 |
| JP | 11-231315 A | | 8/1999 |
| JP | 11-246704 A | | 9/1999 |
| JP | 3120944 B2 | | 10/2000 |
| JP | 2000-292788 A | | 10/2000 |
| JP | 2000-297110 A | | 10/2000 |
| JP | 2000-297111 A | | 10/2000 |
| JP | 2000-297139 A | | 10/2000 |
| JP | 3131034 B2 | | 11/2000 |
| JP | 2000-305073 A | | 11/2000 |
| JP | 2000-338311 A | | 12/2000 |
| JP | 2000-348515 A | | 12/2000 |
| JP | 2000-352719 A | | 12/2000 |
| JP | 2000-353413 A | | 12/2000 |
| JP | 2001-4846 A | | 1/2001 |
| JP | 2001-21881 A | | 1/2001 |
| JP | 2001-31774 A | | 2/2001 |
| JP | 2001-81292 A | | 3/2001 |
| JP | 2001-124909 A | | 5/2001 |
| JP | 2002-40214 A | | 2/2002 |

* cited by examiner

LIGHT DIFFUSION FILM, PLANE LIGHT SOURCE DEVICE AND LIQUID CRYSTAL DISPLAY APPARATUS FOR ENHANCING A CONSTANT LUMINANCE AND DIFFUSING A LIGHT

This application is the national phase under 35 U.S.C. § 371 of PCT International Application No. PCT/JP02/05313 which has an International filing date of May 30, 2002, which designated the United States of America.

TECHNICAL FIELD

The present invention relates to a light-diffusing film useful for diffusing a light ray, a plane light source device and a liquid crystal display apparatus using the same.

BACKGROUND ART

In a backlight type display apparatus (a liquid crystal display apparatus) illuminating a display panel (e.g., a liquid crystal display module) from its backside, a plane or flat light source unit (or a backlight unit) is disposed on the backside of the display panel. Moreover, a diffusing sheet, a prism sheet, a sheet for improving luminance (a reflective polarizing plate, etc) or the like is employed in order to uniformize an illuminating light (illuminating radiation) on a display panel for using it as a plane or flat light source and to enhance the luminance in the front side of a liquid crystal display apparatus. Further, in a liquid crystal display apparatus, a polarizing plate, a phase plate or the like is used as a constituent member of a liquid crystal cell. Furthermore, a liquid crystalline material, a color filter or the like is also utilized.

More specifically, for example, as a plane or flat display apparatus of which the image display area has a flat surface (a flat type display apparatus), the apparatus as illustrated in FIG. 6 has been known. The apparatus comprises a plane or flat display unit (e.g., a transmissive liquid crystal display unit) 45 and a plane light source unit adapted to illuminate the display unit from its backside. The plane or flat light source unit comprises at least one fluorescent discharge tube (cold cathode tube) 41, a reflector 42 disposed on the back side of the fluorescent discharged tube 41 for reflecting a light, a diffusing plate 43 interposed between the fluorescent discharged tube 41, a display unit 45 for diffusing the light and uniformly illuminating the display unit 45, and a prism sheet 44 laminated on the display unit side of the diffusing plate 43. The flat display unit 45, in the case of a liquid crystal display unit, comprises a first polarizing film 46a, a first glass substrate 47a, a first electrode 48a on the glass substrate, a first alignment layer 49a laminated on the electrode, a liquid crystal layer 50, a second alignment layer 49b, a second electrode 48b, a color filter 51, a second glass substrate 47b, and a second polarizing film 46b as successively built up (laminated) in that order. In such a display apparatus, the display unit can be directly illuminated from the backside by the built-in fluorescent tube (cold cathode tube) 41.

Moreover, an apparatus which comprises a backlight unit having such a light guide as illustrated in FIG. 7 as the backlight system of the flat display apparatus of FIG. 6 has been known. This backlight unit comprises a tubular light source 51 such as a fluorescent tube (cold cathode tube) disposed adjacent to a lateral side of a light guide 54, the light guide 54 for guiding a light from the tubular light source to a display panel, a diffusing plate 53 disposed on the top (emitting side or front side) of the light guide 54, and a reflector 55 disposed opposite to the display unit of the light guide. Incidentally, the thickness of the light guide 54 at the side adjacent to the tubular light source 51 is larger than that at the other side, so that the light from the tubular light source 51 is guided by the light guide 54, reflected by the reflector 55, emerged from the emerging surface (front) of the light guide 54, diffused by the diffusing plate 53, and then incident on the plane display unit (not shown) constructed (laminated) on the diffusing plate. Incidentally, in the case where a plurality of tubular light sources are disposed on a light guide to improve the luminance of the display apparatus (in the case where fluorescent tubes are used in both sides or two or more sides of the light guide), there can be usually employed a light guide in which almost whole area thereof is approximately equal in thick.

In the bottom of the light guide, white scatterers scattering a light in a wide and radial pattern are regularly arranged in dot pattern, and form a light-scattering dot.

However, in the plane light source device employing a fluorescent discharge tube, a light guide, a diffusing plate, a prism sheet (further if necessary, a protecting film for the prism sheet) as described above, costs for raw materials and for assembling are driven up due to a large number of components, and the defective fraction is increased because exogenous materials are apt to enter between components. Incidentally, it is also considered to remove the exogenous materials, but costs for assembling are further driven up. A low-cost plane light source device is, accordingly, desirable.

Recently, as a plane light source device having a simplified structure and being low in cost, there has been, proposed a plane light source device in which a wedge-shaped reflecting groove is formed at the bottom of a light guide and the reflecting light is utilized [for example, Japanese Patent Application Laid-Open No. 231315/1999 (JP-11-231315A), Japanese Patent Application Laid-Open No. 305073/2000 (JP-2000-305073A), Japanese Patent Application Laid-Open No. 348515/2000 (JP-2000-348515A, Japanese Patent Application Laid-Open No. 352719/2000 (JP-2000-352719A), Japanese Patent Application Laid-Open No. 353413/2000 (JP-2000-353413A), Japanese Patent Application Laid-Open No. 4846/2001 (JP-2001-4846A), Japanese Patent Application Laid-Open No. 21881/2001 (JP-2001-21881A), Japanese Patent Publication No. 3131034, Japanese Patent Publication No. 3120944].

The plane light source device is capable of emitting a light from the vicinity of a front of the plane light source unit. However, the light is scattered by a scattering dot of the light guide or a diffusing sheet at a large scattering angle, and the light cannot be focused with the use of a prism sheet. It is, therefore, impossible to uniformly illuminate the intra-surface of the plane light source unit and forming a uniform plane light source is difficult.

To solve such problems, a diffusing sheet is disposed on the light guide having a wedge-shaped reflecting groove. However, in the case where the diffusing sheet is disposed, the luminance is extremely deteriorated, and TCO standard (The Swedish Confederation of Professional employee) which limits change of the luminance, when the display member is observed from an oblique direction, is unsatisfied.

Japanese Patent Application Laid-Open No. 31774/2001 (JP-2001-31774A) discloses a transmissive light-scattering sheet having an islands-in-an ocean structure composed of resins different from each other in refractive index, wherein the mean particle size of the island polymer is 0.5 to 10 μm, the ratio of the ocean polymer relative to the island polymer is 70/30 to 40/60 (weight ratio), and the thickness of the sheet is 5 to 200 µm. The literature also discloses that the scattering light is diffused within the range of a scattering angle of 5 to 50° with orienting.

Further, in a conventional liquid crystal display apparatus, an ultraviolet ray (light) leaks out from a tubular light source such as a fluorescent tube, and constituent members of the plane light source unit (for example, the diffusing sheet, the prism sheet, the sheet for improving luminance (a reflective polarizing plate, etc.), the polarizing plate, the phase plate, the liquid crystalline material and the color filter) are deteriorated in long-standing use.

Japanese Patent Application Laid-Open No. 246704/1999 (JP-11-246704A) proposes protection of a liquid crystal cell with the use of a protecting film for a polarizing plate, wherein the protecting film comprises an ultraviolet absorber (ultraviolet ray absorbing agent).

Moreover, to inhibit leakage of the ultraviolet ray, there may be proposed a method in which an ultraviolet absorbable film is disposed adjacent to a fluorescent tube in a backlight unit, or a method in which an ultraviolet absorber is added to a light guide. However, in the former method, it is necessary to use a high heat-resistant film, and in the latter method, the color (hue) changes over the whole apparatus because the ultraviolet absorber slightly absorbs visible lights.

In order to inhibit leakage of an ultraviolet ray, conversion of a slight amount of an ultraviolet ray from a fluorescent tube into visible light is proposed with the use of a fluorescent material (e.g., magnesium oxide, titanium oxide) as a white scatterer formed in the bottom of the light guide. However, even in such a method, an ultraviolet ray leaks from a backlight unit. Thus, a diffusing sheet, a prism sheet, and a sheet for improving luminance (a reflective polarizing plate, etc.) are exposed to the ultraviolet ray over the long term, and as a result these sheets are tinged with yellow. In particular, in a backlight having a wedge-shaped reflecting groove formed at the bottom of a light guide, a strong ultraviolet ray leaks from the light guide because the white scatterer composed of the fluorescent material is not employed.

It is, therefore, an object of the present invention to provide a light-diffusing film (or light-scattering film) which is capable of simplifying the structure and is useful for enhancing the luminance, and a plate (or flat) light source device using the film and a liquid crystal display apparatus (particularly a reflective liquid crystal display apparatus) using the film.

It is another object of the present invention to provide a light-diffusing film which is capable of enhancing the luminance and the visibility from the inclined direction even using a light guide having a wedge-shaped reflecting groove, and a plate (or flat) light source device using the film and a liquid crystal display apparatus (particularly a reflective liquid crystal display apparatus) using the film.

It is still another object of the present invention to provide a light-diffusing film which is capable of uniformizing the luminance of the display member, inhibiting dazzle in the display surface and moire generated in correlation between a liquid crystal cell and a plane light source, and improving the display quality level, and a plate (or flat) light source device using the film and a liquid crystal display apparatus (particularly a reflective liquid crystal display apparatus) using the film.

Moreover, a further object of the present invention is to provide a light-diffusing film which is capable of stably maintaining the display quality level over the long term, and effectively protecting constituent members from an ultraviolet ray leaked from a light source, and a plate (or flat) light source device using the film and a liquid crystal display apparatus (particularly a reflective liquid crystal display apparatus) using the film.

A still further object of the present invention is to provide a light-diffusing film which is capable of effectively protecting constituent members from leaked ultraviolet ray without using a white scatterer composed of a fluorescent material, and a plate (or flat) light source device using the film and a liquid crystal display apparatus (particularly a reflective liquid crystal display apparatus) using the film.

DISCLOSURE OF INVENTION

The inventors of the present invention did much research to accomplish the above objects and found that: in a plane light source unit comprising a wedge-shaped reflecting groove formed at the bottom of a light guide, use of a light-diffusing film having appropriate anisotropy (anisotropic property) and scattering property (haze) realizes a plane light source device in which deterioration of the luminance is inhibited and TCO standard is accepted. Moreover, the inventors of the present invention found that: by disposing a film having light-scattering property and ultraviolet absorbability on a light-emitting surface of a plane light source unit, leakage of an ultraviolet ray is extremely inhibited at a lower cost with reliability and certainty over the long term, and various constituent members (such as a plane light source device and a liquid crystal cell) are effectively protected from leaked ultraviolet ray, as a result deterioration of functions of a liquid crystal display apparatus is inhibited. The present invention has been developed on the basis of the above findings.

That is, the light-diffusing film of the present invention (anisotropic light-diffusing film) includes a light-scattering film capable of scattering an incident light in a light-advancing direction, wherein light-scattering characteristics $Fx(\theta)$ and $Fy(\theta)$ show a gradual decay pattern as a light-scattering angle $\theta$ becomes a wider angle, and a light-scattering characteristic $F(\theta)$ fulfills (satisfies) the following expressions representing the relationship between the light-scattering angle $\theta$ and a scattered light intensity $F$:

$$Fy(\theta)/Fx(\theta) \geq 1.01 \ (\theta=4 \text{ to } 30°)$$

wherein $Fx(\theta)$ represents a light-scattering characteristic in an X-axial direction of the film and $Fy(\theta)$ represents a light-scattering characteristic in a Y-axial direction of the film. Moreover, the light-scattering characteristics $Fx(\theta)$ and $Fy(\theta)$ of the anisotropic light-diffusing film may fulfill $1.01 \leq Fy(\theta)/Fx(\theta) \leq 100$, or may fulfill $Fy(\theta)/Fx(\theta) \geq 1.1$ (for example, $1.1 \leq Fy(\theta)/Fx(\theta) \leq 500$), over a range of $\theta=4$ to 30°. Further, the light-diffusing film has a light-scattering characteristics $Fx(\theta)$ and $Fy(\theta)$ fulfilling the expression $1.1 \leq Fy(\theta)/Fx(\theta) \leq 20$ in a scattering angle of $\theta=18°$. The light-scattering characteristics may fulfill the following expressions: $1.01 \leq Fy(\theta)/Fx(\theta) \leq 20$ ($\theta=4$ to 30°) and $1.1 \leq Fy(\theta)/Fx(\theta) \leq 10$ ($\theta=18°$). Such a light-diffusing film may have ultraviolet absorbability. Use of the light-diffusing film fulfilling the above-mentioned light-scattering characteristics realizes high uniformity of the luminance in the display surface which is observed from a wide angle in a direction such as the horizontal direction and the vertical direction.

Incidentally, each of the characteristics, $Fx(\theta)$ and $Fy(\theta)$, represents scattered light intensities of a transmitted light at a scattering angle θ in the case where a direction of an incident light is perpendicular to an anisotropic light-diffusing film, wherein y denotes a main scattering direction of the anisotropic light-diffusing sheet, and x denotes a direction perpendicular to the main scattering direction in a plane of the anisotropic light-diffusing film. Accordingly, $Fy(θ)$ represents a scattered light intensity at the main scattering direction of the anisotropic light-diffusing sheet, and $Fx(θ)$ represents a scattered light intensity at the direction perpendicular to the main scattering direction of the anisotropic light-diffusing sheet. Moreover, an X-axial direction of the anisotropic light-diffusing film is usually a major axial direction of a dispersed phase particle, and a Y-axial direction of the anisotropic light-diffusing film is usually a minor axial direction of the dispersed phase particle. Thus, $Fx(θ)$ represents a scattered light intensity at the major axial direction of the dispersed phase particle of the film, and $Fy(θ)$ represents the scattered light intensity at the minor axial direction of the dispersed phase particle of the film.

Moreover, the present invention also includes a light-diffusing film for disposing on a light-emitting side of a plane light source unit, wherein the film has ultraviolet absorbability for absorbing an ultraviolet ray leaked from the plane light source unit. The light-diffusing film may be an isotropic diffusing film in which an incident light is diffused isotropically, or may be an anisotropic diffusing film in which an incident light is diffused anisotropically. That is, the light-diffusing film may show an anisotropy in light scatteration (or an anisotropic light scatteration). Use of such a film realizes uniformity of the luminance in the display surface which is observed even from a wide angle in a direction such as the horizontal direction and the vertical direction in a plane light source device. For example, a light-scattering characteristic $F(θ)$ representing the relationship between a light-scattering angle θ and a scattered light intensity F may fulfill the above-mentioned light-scattering characteristics, for example, $Fy(θ)/Fx(θ) \geq 1.01$ (preferably $Fy(θ)/Fx(θ) \geq 1.1$, e.g., $1.1 \leq Fy(θ)/Fx(θ) \leq 500$) over a range of θ=4 to 30°, wherein $Fx(θ)$ represents the light-scattering characteristic in an X-axial direction of the film and $Fy(θ)$ represents the light-scattering characteristic in a Y-axial direction of the film. Moreover, the scattering characteristic $Fx(θ)$ and scattering characteristic $Fy(θ)$ may fulfill the following expression, $1.1 \leq Fy(θ)/Fx(θ) \leq 20$ at θ=18°. Such an anisotropic light-diffusing film apparently ensures uniformity of the luminance in a direction such as the horizontal direction and the vertical direction.

The light-diffusing film need only comprise at least a light-diffusing layer, and may be formed with a monolayer structure, or a laminated structure (laminator), for example, a laminated structure comprising a light-diffusing layer composed of a plurality of resins which are different from each other in refractive index, and a transparent layer laminated on at least one side of the light-diffusing layer. In a light-diffusing film having ultraviolet absorbability, an ultraviolet absorber may be included in the light-diffusing layer and/or the transparent layer, and is usually included in at least the transparent layer. Among such laminated films, arrangement of the transparent layer on a light-emitting surface of a plane light source unit realizes effective protection of the light-diffusing layer and more stable inhibition of ultraviolet leakage.

The light-diffusing layer may comprise a continuous phase and a dispersed phase (or a dispersed phase particle) which are different from each other in refractive index. Each of the phases, the continuous phase and the dispersed phase, may comprise a thermoplastic resin, the ratio of the continuous phase relative to the dispersed phase may be about 99/1 to 50/50 (weight ratio). The continuous phase may comprise a crystalline resin (e.g., a crystalline polypropylene-series resin), and the dispersed phase may comprise a noncrystalline resin (e.g., at least one resin selected from a noncrystalline copolyester-series resin and a polystyrenic resin). The light-diffusing film may further comprise a compatibilizing agent for the continuous phase and the dispersed phase.

The anisotropic light-diffusing film may be composed of a continuous phase and a dispersed phase particle which are different from each other in refractive index, and usually the mean aspect ratio of the dispersed phase particles is larger than 1 and the major axes of the dispersed phase particles are oriented in the X-axial direction being an oriented direction of the film. For example, the mean size of the minor axes of the dispersed phase particles is about 0.1 to 10 μm, and the mean aspect ratio of the dispersed phase particles is about 5 to 500.

Incidentally, the light-diffusing film (e.g., the anisotropic light-diffusing film) usually has a thickness of about 3 to 300 μm, a total light transmittance of not less than 85% (e.g., not less then 90%), and a haze of not less than 50% (e.g., not less than 60%).

The present invention also discloses a device or apparatus (a plane light source device and a display apparatus) using the light-diffusing film. In the plane light source device of the present invention, the light-diffusing film may be disposed on a light-emitting side of a plane light source unit. The plane light source unit may comprise a light guide whose lateral side is disposed adjacent to a light source (e.g., a tubular light source) and which guides a light from the light source, and a wedge-shaped reflecting groove formed at the bottom of the light guide for reflecting a light guided by the light guide to a light-emitting side. In the case of using the light guide having the wedge-shaped reflecting groove, almost regularly reflected light in a light incident on an inclined plane of a wedge can be utilized for illumination, and the light-diffusing film can be effectively utilized without a white scatterer. The light-diffusing film, for example as mentioned above, may comprise a light-diffusing layer and a transparent layer laminated on at least one side of the light-diffusing layer, and the transparent layer may be disposed on a light-emitting side of the light guide of the plane light source unit. Moreover, the display apparatus of the present invention (for example, a transmissive liquid crystal display apparatus) comprises a display unit (e.g., a liquid crystal display unit which comprises a liquid crystal cell having a liquid crystal sealed therein) and the plane light source device disposed on the backside of the display unit for illuminating the display unit. In the apparatus, the light-diffusing film (in particular, the light-diffusing film having anisotropic light-diffusing properties) may be disposed toward various directions relative to the plane light source unit. For example, assuming that a horizontal direction of a liquid crystal display surface is a Y-axis, the light-diffusing film may be disposed in such manner that a Y-axis of the light-diffusing film (main light-scattering direction) is parallel with the lines of the Y-axis of the liquid crystal display surface. In the case where the light-diffusing film is disposed toward such a direction, a standard which requires uniformity of the luminance in the lateral side (TCO: The Swedish Confederation of Professional employee) can be fulfilled.

Throughout this specification, the term "film" is used without regard to thickness, thus means a sheet as well.

BEST MODE FOR CARRYING OUT THE INVENTION

Figure 1:
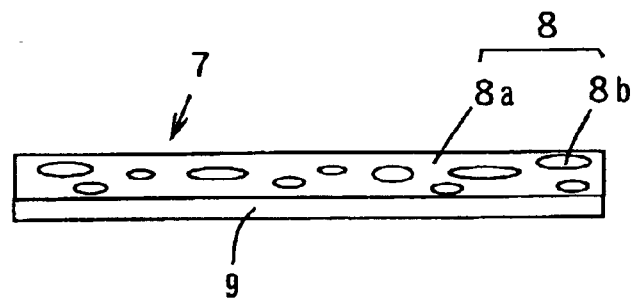
FIG. 1 is a schematic sectional view showing an embodiment of a light-diffusing film.

The present invention shall now be described in detail with reference to the attached drawings.

The light-diffusing film of the present invention comprises at least a light-diffusing layer. The light-diffusing layer may comprise a plurality of resins which are different from each other in refractive index (refraction index), and if necessary an ultraviolet absorber (ultraviolet ray absorbing agent). Moreover, the light-diffusing layer comprises a continuous phase (resin continuous phase, matrix resin), a dispersed phase which is dispersed in the continuous phase (scattering factor such as a particulate or fibrous dispersed phase), and if necessary an ultraviolet absorber. The continuous phase and the dispersed phase are different from each other in refractive index, and are usually incompatible or hardly compatible with each other. The continuous phase and the dispersed phase may be usually formed from a transparent material.

The light-diffusing film need only comprise at least a light-diffusing layer, and may be formed with a monolayer structure of the light-diffusing layer, or a laminated structure (laminator) composed of a light-diffusing layer and a transparent layer laminated on at least one side of the light-diffusing layer.

Moreover, in the light-diffusing film having a laminated structure, a transparent layer (transparent resin layer) may be laminated on not only one side but also both sides of the light-diffusing layer. As a resin constituting the transparent layer, the same or different resin as a resin of the continuous phase and/or dispersed phase constituting the light-diffusing layer may be used as far as the light-diffusing film is not deteriorated in adhesiveness and mechanical property, and usually, the same or common (or same series) resin as a resin constituting the continuous resin is preferably employed. As the transparent layer, not only a resin layer but also various transparent substrates (base material), such as glass, can be used.

Moreover, ultraviolet absorbability may be imparted to the light-diffusing film not only by including an ultraviolet absorber to various layers constituting the light-diffusing film but also by forming a coating layer containing an ultraviolet absorber. In a light-diffusing film having a laminated structure and comprising a light-diffusing layer and a transparent resin layer, an ultraviolet absorber is included in at least one layer between the light-diffusing layer and the transparent resin layer (particularly the transparent resin layer) in many cases, and an ultraviolet absorber may be included in both layers.

An ultraviolet absorbable light-diffusing film may diffuse a transmitted light isotropically, or diffuse a transmitted light anisotropically. In the case of diffusing anisotropically, a plane light source unit or apparatus using the film realizes high uniformity of the luminance in the display surface which is observed from a wide angle in a direction such as the horizontal direction and the vertical direction.

The anisotropic light-diffusing sheet need only be a film capable of scattering an incident light in the light-advancing direction, not scattering the light isotropically, and having strong scattering intensity at a given direction in addition having stronger scattering intensity than that at scattering angle in a direction perpendicular to the given direction even when a scattering angle at the given direction is larger.

FIG. 1 is a schematic sectional view showing an embodiment of a light-diffusing film. In the embodiment, a light-diffusing film 7 has a laminated structure composed of a light-diffusing layer 8 and a transparent layer (transparent resin layer) 9 laminated on at least one side of the light-diffusing layer. In order to impart ultraviolet absorbability to the light-diffusing film, an ultraviolet absorber may be comprised in at least the transparent layer 9. Moreover, the light-diffusing layer 8 comprises a plurality of resins which are different from each other in refractive index, and has a phase separation structure (or an islands-in-an ocean structure) in which a dispersed phase particle 8b is dispersed in a continuous phase 8a.

In the light-diffusing film having such a laminated structure, the light-diffusing layer can be protected by the transparent layer 9 to prevent falling out of the dispersed phase particle or sticking, thereby improving flaw or scratch resistance or stability in a producing process of the film, in addition to enhance strength or handling thereof. Furthermore, in the case where at least the transparent layer 9 comprises an ultraviolet absorber, by laminating or disposing the transparent layer 9 on a light-emitting surface of the plane light source unit, the light-diffusing layer 8 is also effectively protected from an ultraviolet ray, and leakage of an ultraviolet ray can be inhibited certainly and stably.

Figure 2:
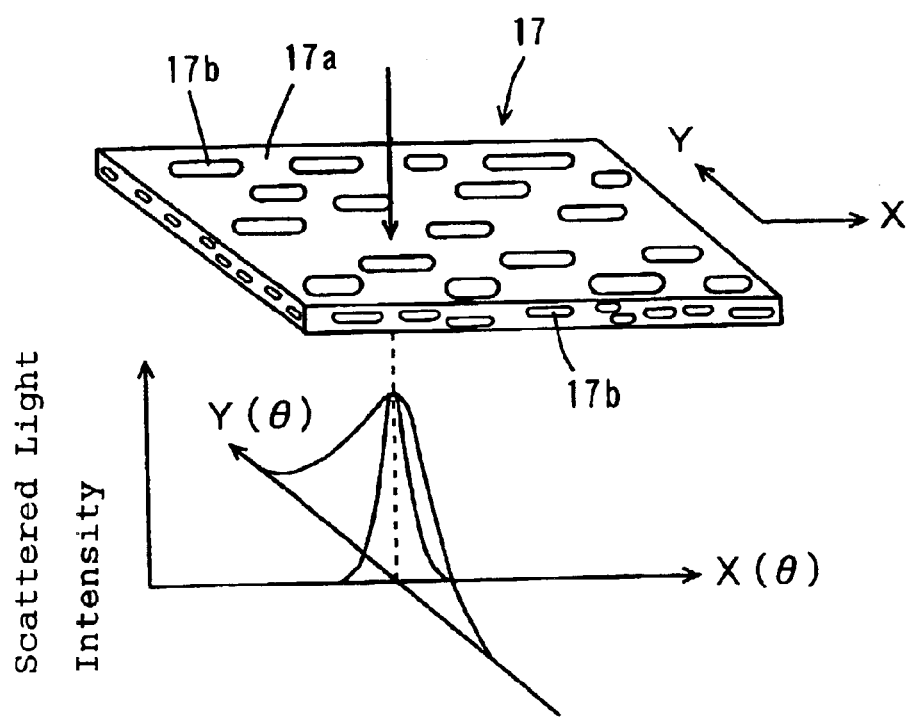
FIG. 2 is a conceptual view illustrating an anisotropic light-scattering property of a light-diffusing film.

FIG. 2 is a conceptual view illustrating an anisotropy of light-diffusion. As shown in FIG. 2, an anisotropic light-diffusing film 17 comprises a continuous phase 17a composed of a resin, and an dispersed phase 17b having various forms, which is dispersed in the continuous phase. Concerning an anisotropy of light-diffusion, in a light-scattering characteristic $F(\theta)$ representing the relationship between the light-scattering angle $\theta$ and a scattered light intensity F, light-scattering characteristics $Fx(\theta)$ and $Fy(\theta)$ show a gradual decay pattern with increasing a light-scattering angle $\theta$, wherein $Fx(\theta)$ represents the light-scattering characteristic in an X-axial direction of the film and $Fy(\theta)$ represents the light-scattering characteristic in a Y-axial direction perpendicular to the X-axial direction. Incidentally, the X-axial direction of the anisotropic light-diffusing film 17 is usually the major axial direction of the dispersed phase 17b. That is, $Fx(\theta)$ represents the scattered light intensity at the major axial direction of the dispersed phase particle of the film, and $Fy(\theta)$ represents the scattered light intensity at the minor axial direction of the dispersed phase particle of the film. Moreover, over a range of a scattering angle $\theta=4$ to $30°$, the value of $Fy(\theta)/Fx(\theta)$ is not smaller than 1.01, for example about 1.01 to 100, preferably about 1.01 to 50, more preferably about 1.01 to 20, and usually about 1.1 to 10. Further, at a scattering angle=18°, the value of Fy(θ)/Fx(θ) is about 1.1 to 20, preferably about 1.1 to 15 (for example, about 1.1 to 10), and more preferably about 1.1 to 8 (for example, about 1.1 to 5). The use of the anisotropic light-diffusing film of the present invention having such optical properties realizes scatteration of an incident light in the light-advancing direction, and improvement of the luminance-uniformity on the display surface even when observed from a wide angle in the horizontal direction or the vertical direction for using it as a plane light source unit or apparatus, as a result, the film ensures expansion or enlargement of the viewing angle. That is, with the use of the light-diffusing film, the luminance of the horizontal direction or the vertical direction on the display surface of the display unit can be uniformized. Incidentally, in the case where the value of Fy(θ)/Fx(θ) and the value of Fy(θ)/Fx(θ) (θ=18°) are too large, unevenness of the display image becomes heavier when the film is disposed in such a manner that the Y-axial direction thereof is oriented to the horizontal direction (Y-axial direction) of the display member and the display member is observed from the vertical direction (X-axial direction) of the display member. In the case where these values are too small, the film is considered to be an isotropic light-diffusing film, and when the display member is observed from the horizontal direction, the luminance variation becomes larger and the viewing angle becomes narrower. As a result, TCO standard cannot be satisfied.

Furthermore, in the anisotropic light-diffusing sheet (including an anisotropic light-diffusing sheet having ultraviolet absorbability), the characteristic of scattered light intensity fulfills (or satisfies) Fy(θ)/Fx(θ)≧1.01 over a range of θ=4 to 30° as described above, the characteristic of scattered light intensity may be Fy(θ)/Fx(θ)≧1.1, and particularly Fy(θ)/Fx(θ)≧1.5. The value of Fy(θ)/Fx(θ) may be usually about 1.1 to 500 (for example, about 10 to 500), preferably about 15 to 500, and more preferably about 50 to 500 (for example, about 100 to 400). Incidentally, at a scattering angle=18°, the value of Fy(θ)/Fx(θ) may be the same as mentioned above.

Such an anisotropic light-diffusing film has the following characteristics: the scattered light intensity Fy(θ) in the Y-axial direction is large through very wide scattering angle θ, and the scattered light intensity Fx(θ) in the X-axial direction is decayed in a small scattering angle θ. A light-diffusing film having such optical characteristics realizes that the luminance is uniformized in the horizontal direction and the vertical direction in a display surface of the display unit.

Figure 3:
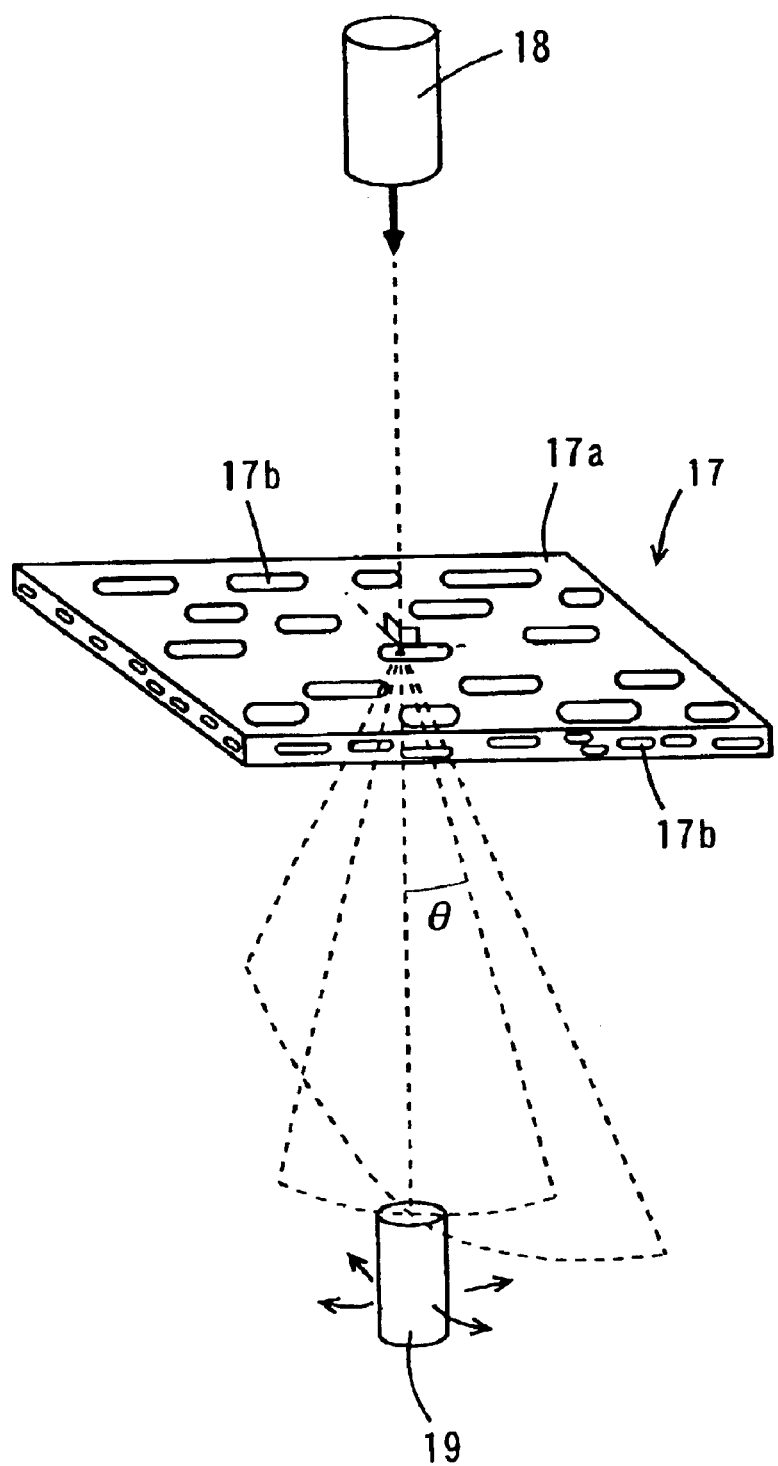
FIG. 3 is a schematic sectional view illustrating a method for measuring a light-scattering property.

The scattering characteristic F(θ) can be measured using an instrument shown in FIG. 3. This instrument comprises a laser irradiating unit (Nihon Kogaku Eng., NEO-20MS) 18 for projecting a laser light to the anisotropic light-diffusing sheet 17 and a detector 19 for quantitating the intensity of the laser light transmitted through the anisotropic light-diffusing sheet 17. The laser light is emitted at an angle of 90° with respect to (emitted perpendicular to) the surface of the light-diffusing sheet 17 and the intensity of light diffused by the film (diffusion intensity) F is measured (plotted) against the diffusing angle θ, whereby the light-scattering characteristic can be determined.

In the anisotropic light-diffusing film, when the anisotropy of the light scattering thereof is higher, the angle dependence of the scattering in a given direction can be lower, therefore, the angle dependence of the luminance can be also lower. In the anisotropic light-diffusing sheet, assuming that the angle being perpendicular (90°) to the display surface is 0°, the luminance can be prevented from decreasing even at the angle of not less than 40°, over that of 20°, on the display surface.

Such a characteristic may be represented by a ratio of the luminance in a given scattering angle (θ) relative to the front luminance on the display surface, or by a ratio of the luminances at two scattering angles (θ). That is, the use of the light-diffusing film or the plane or flat light source unit of the present invention makes the value of the above-mentioned rate smaller. For instance, a ratio of the front luminance (N(0°)) at the angle which is perpendicular to the display surface (θ=0°) relative to the luminance at the angle of 18° (N(18°)) or at the angle of 40° (N(40°)), a ratio of the luminance at the angle of 18° (N(18°)) relative to that at the angle of 40° (N(40°)) can be made smaller. By using an anisotropic light-diffusing sheet in which these ratios are small for a liquid crystal display apparatus (for example, by disposing the anisotropic light-diffusing sheet on a prism sheet of the above-mentioned liquid crystal display apparatus), a transmissive liquid crystal display apparatus which is suitable for a business monitor satisfying (or meeting) TCO99 standard can be provided. The ratio of the luminance at the angle of 18° (N(18°)) relative to that at the angle of 40° (N(40°)) [N(18°)/N(40°)] is, for example, not larger than 2.0 (about 1.3 to 1.9), preferably about 1.4 to 1.8, more preferably about 1.4 to 1.7, and usually not larger than 1.7 (for example, about 1.35 to 1.7).

In the light-diffusing film, the dispersed phase particles may be a globular particle in which the ratio of the mean size (length) L of the major axis relative to the mean size (width) W of the minor axis (mean aspect ratio: L/W) is 1. Moreover, in the anisotropic light-diffusing film, the aspect ratio is larger than 1, and the major axial direction of each dispersed phase particle is oriented to the X-axial direction of the film. The mean aspect ratio (L/W) is, for example, about 1 to 1000 (e.g., about 2 to 1000), preferably about 5 to 1000, more preferably about 5 to 500 (e.g., about 20 to 500), and usually 50 to 500 (particularly about 70 to 300). The preferred mean aspect ratio (L/W) to impart an anisotropy to a film is, for example, about 1.01 to 100, preferably about 1.1 to 50 (e.g., 1.1 to 10) and more preferably about 1.5 to 10 (e.g., 1.5 to 5), and may be about 1.5 to 3. The morphology of such a dispersed phase particle may, for example, be a football-like (e.g., spheroidal), filamentous or cuboid. The larger the aspect ratio is, the higher is the anisotropy expressed in the scattering of light.

The mean size L of the major axis of the dispersed phase particle may, for example, be about 0.1 to 200 μm (e.g., about 1 to 100 μm), preferably about 1 to 150 μm (e.g., about 1 to 80 μm), particularly about 2 to 100 μm (e.g., about 2 to 50 μm), and usually about 10 to 100 μm (e.g., about 30 to 100 μm, particularly about 10 to 50 μm). The mean size W of the minor axis of the dispersed phase particle may, for example, be about 0.1 to 100 μm, preferably about 0.5 to 50 μm (e.g., about 0.5 to 20 μm), and usually about 0.5 to 10 μm (e.g., about 0.5 to 5 μm).

Moreover, in the ultraviolet absorbable light-diffusing film, the mean size W of the minor axis of the dispersed phase may, for example, be about 0.1 to 10 μm, preferably about 0.15 to 5 μm (e.g., about 0.5 to 5 μm), and more preferably about 0.2 to 2 μm (e.g., about 0.5 to 2 μm). The mean size W of the minor axis of the dispersed phase may, for example, be about 0.01 to 0.5 μm, preferably about 0.05 to 0.5 μm, and more preferably about 0.1 to 0.4 μm.

The orientation coefficient of dispersed phase particles may, for example, be not less than 0.34 (e.g., about 0.34 to 1), preferably about 0.4 to 1 (e.g., about 0.5 to 1), more preferably about 0.7 to 1 (e.g., about 0.8 to 1), and further preferably about 0.9 to 1. The higher the orientation coefficient of the dispersed phase particles is, the higher is the anisotropy imparted to scattered light. The orientation coefficient can be calculated by means of the following equation.

Orientation coefficient=$(3<\cos^2\theta>-1)/2$ where $\theta$ represents the angle between the major axis of the particulate dispersed phase and the X-axis of the film or sheet (when the major axis is parallel to the X-axis, $\theta=0°$); $<\cos^2\theta>$ represents the average of $\cos^2\theta$ values found for individual dispersed phase particles and can be expressed as follows.

$<\cos^2\theta> = \int n(\theta) \cdot \cos^2\theta \cdot d\theta$ (wherein $n(\theta)$ represents the percentage (weight percent) of dispersed phase particles having the angle $\theta$ in the total population of dispersed phase particles.)

The anisotropic light-diffusing film may have directionality of the diffused or scattered light. That is, meaning of a film having directionality is that, among the angles of intense scattering in anisotropic diffusion, there is an angle giving a maximum scattering intensity when the diffused light has directionality. Referring to the measuring system depicted in FIG. 3, when the diffused light intensity F is plotted against the diffusion angle $\theta$, the curve of plots has a maximum or a shoulder (especially an inflection point such as a maximum) within a given range of diffusion angle $\theta$ (angles excluding $\theta=0°$) when the diffused light has directionality.

A resin for constituting the light-diffusing film (a resin for constituting the continuous phase and/or the dispersed phase) includes thermoplastic resins [for example, an olefinic resin, a cyclic olefinic resin, a halogen-containing resin (including a fluorine-containing resin), a vinyl alcohol-series resin, a vinyl ester-series resin, a vinyl ether-series resin, a (meth)acrylic resin, a styrenic resin, a polyester-series resin, a polyamide-series resin, a polycarbonate-series resin, a thermoplastic polyurethane resin, a polysulfone-series resin (e.g., a polyether sulfone, a polysulfone), a polyphenylene ether-series resin (e.g., a polymer of 2,6-xylenol), a cellulose derivative (e.g., a cellulose ester, a cellulose carbamate, a cellulose ether), a silicone resin (e.g., a polydimethylsiloxane, a polymethylphenylsiloxane), a rubber or elastomer (e.g., a diene-series rubber such as a polybutadiene and a polyisoprene, a styrene-butadiene copolymer, an acrylonitrile-butadiene copolymer, an acrylic rubber, a urethane rubber, a silicone rubber)] and thermosetting resins (for example, an epoxy resin, an unsaturated polyester resin, a diallyl phthalate resin, a silicone resin). The preferred resins are the thermoplastic resins.

The olefinic resin includes, for example, a homo- or copolymer of a $C_{2-6}$olefin [e.g., an ethylenic resin such as a polyethylene and an ethylene-propylene copolymer, a polypropylene-series resin such as a polypropylene, a propylene-ethylene copolymer and a propylene-butene copolymer, a poly(methylpentene-1), a propylene-methylpentene copolymer), and a copolymer of a $C_{2-6}$olefin and a copolymerizable monomer (e.g., an ethylene-vinyl acetate copolymer, an ethylene-vinyl alcohol copolymer, an ethylene-(meth)acrylic acid copolymer, an ethylene-(meth) acrylic acid copolymer or a salt thereof (e.g., an ionomer resin), an ethylene-(meth)acrylate copolymer]. As the alicyclic olefinic resin, there may be mentioned a homo- or copolymer of a cyclic olefin such as norbornene and dicyclopentadiene (e.g., a polymer having an alicyclic hydrocarbon group such as tricyclodecane which is sterically rigid), a copolymer of the cyclic olefin and a copolymerizable monomer (e.g., an ethylene-norbornene copolymer, a propylene-norbornene copolymer). The alicyclic olefinic resin can be commercially available as, for example, the trade name "ARTON", the trade name "ZEONEX" and the like.

The halogen-containing resin includes a vinyl halide-series resin (e.g., a homopolymer of a halogen-containing monomer, such as a polyvinyl chloride, a polytetrafluoroethylene, a polychlorotrifluoroethylene, and a poly(vinyl fluoride); a copolymer of a halogen-containing monomer, such as a tetrafluoroethylene-hexafluoropropylene copolymer and a tetrafluoroethylene-perfluoroalkyl vinyl ether copolymer; and a copolymer of a halogen-containing monomer and other copolymerizable monomer, such as a vinyl chloride-vinyl acetate copolymer, a vinyl chloride-(meth)acrylate copolymer and a tetrafluoroethylene-ethylene copolymer), and a vinylidene halide-series resin (e.g., a copolymer of a halogen-containing vinylidene monomer and a other copolymerizable monomer, such as a poly(vinylidene chloride), a poly (vinylidene fluoride), and a vinylidene chloride-(meth) acrylate copolymer).

The derivative of the vinyl alcohol-series resin includes a polyvinyl alcohol, an ethylene-vinyl alcohol copolymer, etc. The vinyl ester-series resin includes a homo- or copolymer of a vinyl ester-series monomer (e.g., a polyvinyl acetate, a polyvinyl propionate), a copolymer of a vinyl ester-series monomer and a copolymerizable monomer (e.g., a vinyl acetate-ethylene copolymer, a vinyl acetate-vinyl chloride copolymer, a vinyl acetate-(meth)acrylate copolymer), or a derivative thereof. The derivative of the vinyl ester-series resin includes a polyvinyl alcohol, an ethylene-vinyl alcohol copolymer, a polyvinyl acetal resin, and others.

As the vinyl ether-series resin, there may be mentioned a homo- or copolymer of a vinyl $C_{1-10}$alkyl ether, such as vinyl methyl ether, vinyl ethyl ether, vinyl propyl ether and vinyl t-butyl ether, a copolymer of a vinyl $C_{1-10}$alkyl ether and a copolymerizable monomer (e.g., a vinyl alkyl ether-maleic anhydride copolymer).

As the (meth)acrylic resin, a homo- or copolymer of a (meth)acrylic monomer and a copolymer of a (meth)acrylic monomer and a copolymerizable monomer can be employed. As the (meth)acrylic monomer, there may be mentioned, for example, (meth)acrylic acid; a $C_{1-10}$alkyl (meth)acrylate such as methyl (meth)acrylate, ethyl (meth) acrylate, butyl (meth)acrylate, t-butyl (meth)acrylate, isobutyl (meth)acrylate, hexyl (meth)acrylate, octyl (meth) acrylate and 2-ethylhexyl (meth)acrylate; an aryl (meth) acrylate such as phenyl (meth)acrylate; a hydroxyalkyl (meth)acrylate such as hydroxyethyl (meth)acrylate and hydroxypropyl (meth)acrylate; glycidyl (meth)acrylate; an N,N-dialkylaminoalkyl (meth)acrylate; (meth)acrylonitrile; a (meth)acrylate having an alicyclic hydrocarbon group such as tricyclodecane. The copolymerizable monomer includes the above styrenic monomer, a vinyl ester-series monomer, maleic anhydride, maleic acid, and fumaric acid. The monomer can be used singly or in combination.

As the (meth)acrylic resin, there may be mentioned a poly(meth)acrylate such as a polymethyl methacrylate, a methyl methacrylate-(meth)acrylic acid copolymer, a methyl methacrylate-(meth)acrylate copolymer, a methyl methacrylate-acrylate-(meth)acrylic acid copolymer, and a (meth)acrylate-styrene copolymer (MS resin). The preferred (meth)acrylic resin includes a poly($C_{1-6}$alkyl (meth)

acrylate) such as a poly(methyl (meth)acrylate), in particular, a methyl methacrylate-series resin comprising methyl methacrylate as a main component (about 50 to 100% by weight, and preferably about 70 to 100% by weight).

The styrenic resin includes a homo- or copolymer of a styrenic monomer (e.g., a polystyrene, a styrene-α-methylstyrene copolymer, a styrene-vinyl toluene copolymer) and a copolymer of a styrenic monomer and other polymerizable monomer (e.g., a (meth)acrylic monomer, maleic anhydride, a maleimide-series monomer, a diene). The styrenic copolymer includes, for example, a styrene-acrylonitrile copolymer (AS resin), a copolymer of styrene and a (meth)acrylic monomer [e.g., a styrene-(meth)acrylate copolymer such as a styrene-methyl methacrylate copolymer, a styrene-methyl methacrylate-(meth)acrylate copolymer, and a styrene-methyl methacrylate-(meth)acrylic acid copolymer], and a styrene-maleic anhydride copolymer. The preferred styrenic resin includes a polystyrene, a copolymer of styrene and a (meth)acrylic monomer [e.g., a copolymer comprising styrene and methyl methacrylate as main components such as a styrene-methyl methacrylate copolymer], an AS resin, a styrene-butadiene copolymer and the like.

The polyester-series resin includes an aromatic polyester obtainable from an aromatic dicarboxylic acid such as terephthalic acid [a homopolyester, such as a poly$C_{2-4}$alkylene terephthalate such as a polyethylene terephthalate and a polybutylene terephthalate, and a poly$C_{2-4}$alkylene naphthalate; and a copolyester comprising a $C_{2-4}$alkylene arylate unit (a $C_{2-4}$alkylene terephthalate unit and/or a $C_{2-4}$alkylene naphthalate unit) as a main component (e.g., not less than 50 mole %, preferably 75 to 100 mole %, and more preferably 80 to 100 mole %)], and a liquid crystalline polyester. The copolyester includes a copolyester in which, in the constituting units of a poly$C_{2-4}$alkylene arylate, part of $C_{2-4}$alkylene glycols is substituted with a polyoxy$C_{2-4}$alkylene glycol, a $C_{6-10}$alkylene glycol, an alicyclic diol (e.g., cyclohexane dimethanol, hydrogenated bisphenol A), a diol having an aromatic ring (e.g., 9,9-bis(4-(2-hydroxyethoxy)phenyl)fluorene having a fluorenone side chain, a bisphenol A, bisphenol A-alkylene oxide adduct) or the like, and a copolyester in which, in the constituting units, part of aromatic dicarboxylic acids is substituted with an unsymmetric aromatic dicarboxylic acid such as phthalic acid and isophthalic acid, an aliphatic $C_{6-12}$dicarboxylic acid such as adipic acid or the like. The polyester-series resin also includes a polyarylate-series resin, an aliphatic polyester obtainable from an aliphatic dicarboxylic acid such as adipic acid, and a homo- or copolymer of a lactone such as ε-caprolactone. The polyester-series resin is usually non-crystalline (amorphous) like a noncrystalline (amorphous) copolyester (e.g., a $C_{2-4}$alkylene arylate-series copolyester).

The polyamide-series resin includes an aliphatic polyamide such as nylon 46, nylon 6, nylon 66, nylon 610, nylon 612, nylon 11 and nylon 12, and a polyamide (e.g., an aromatic polyamide such as xylylenediamine adipate (MXD-6)) obtained from a dicarboxylic acid (e.g., terephthalic acid, isophthalic acid, adipic acid) and a diamine (e.g., hexamethylene diamine, metaxylylenediamine). The polyamide-series resin may be a homo- or copolymer of a lactam such as ε-caprolactam, and is not limited to a homopolyamide but may be a copolyamide.

The polycarbonate-series resin includes an aromatic polycarbonate based on a bisphenol (e.g., bisphenol A) and an aliphatic polycarbonate such as diethylene glycol bisallyl carbonate.

Among the cellulose derivatives, the cellulose ester includes, for example, an aliphatic organic acid ester of a cellulose (e.g., a $C_{1-6}$organic acid ester such as a cellulose acetate (e.g., a cellulose diacetate, a cellulose triacetate), a cellulose propionate, a cellulose butyrate, a cellulose acetate propionate, and a cellulose acetate butyrate), an aromatic organic acid ester of a cellulose (e.g., a $C_{7-12}$aromatic carboxylic acid ester such as a cellulose phthalate and a cellulose benzoate), an inorganic acid ester of a cellulose (e.g., a cellulose phosphate, a cellulose sulfate), and may be a mixed acid ester such as an acetate nitrate cellulose ester. The cellulose derivative also includes a cellulose carbamate (e.g., a cellulose phenylcarbamate), a cellulose ether (e.g., a cyanoethylcellulose; a hydroxy$C_{2-4}$alkyl cellulose such as a hydroxyethylcellulose and a hydroxypropylcellulose; a $C_{1-6}$alkyl cellulose such as a methyl cellulose and an ethyl cellulose; a carboxymethyl cellulose or a salt thereof, a benzyl cellulose, an acetyl alkyl cellulose).

If necessary, the resin component may be modified (e.g., rubber-modified). It is also possible to form a continuous phase matrix from the resin component and graft- or block-copolymerize the dispersed phase component with this matrix resin. As examples of such a polymer, there can be mentioned a rubber-block copolymer (e.g., a styrene-butadiene copolymer (SB resin)) and a rubber-grafted styrenic resin (e.g., an acrylonitrile-butadiene-styrene copolymer (ABS resin)).

The dispersed phase (light-scattering factor) can be formed by adding an inorganic or organic fine particle or fiber to a matrix resin, by adding and kneading a resin which is different from a matrix resin in refractive index, or by other means. As the inorganic or organic fine particle, there may be mentioned an inorganic particle such as an inorganic oxide (e.g., a silica, an alumina, a titanium oxide), a carbonate (e.g., a calcium carbonate), a sulfate (e.g., a barium sulfate), a natural mineral, or a silicate (a talc); a crosslinked resin particle, for example, a crosslinked styrenic resin such as a crosslinked polystyrene bead, a crosslinked acrylic resin such as a crosslinked poly(methyl methacrylate), and a crosslinked guanamine-series resin; and others. The fibrous dispersed phase includes an organic fiber and an inorganic fiber. The organic fiber includes heat-resistant organic fibers such as an aramid fiber, a fully aromatic polyester fiber, a polyimide fiber, etc. The inorganic fiber includes fibrous fillers (e.g., inorganic fibers such as a glass fiber, a silica fiber, an alumina fiber, a zirconia fiber, etc.) and flaky fillers (e.g., a mica etc.).

The preferred component for making up the continuous phase or the dispersed phase (discontinuous phase or dispersed phase) includes an olefinic resin, a (meth)acrylic resin, a styrenic resin, a polyester-series resin, a polyamide-series resin and a polycarbonate-series resin. Moreover, the resin constituting the continuous phase and/or dispersed phase may be crystalline or noncrystalline, and the continuous phase and dispersed phase may be formed using non-crystalline resins. In the preferred embodiment, a crystalline resin and a noncrystalline resin can be used in combination. Thus, one (for example, the continuous phase) of the phases (e.g., the continuous phase and the dispersed phase (discontinuous phase)) may be made from a crystalline resin and the other one (for example, dispersed phase) of the phases be made from a noncrystalline resin.

The usable crystalline resin includes an olefinic resin (a polypropylene-series resin with a propylene content of not less than 90 mole %, such as a polypropylene, a propylene-ethylene copolymer, etc., a poly(methyl-pentene-1), etc.), a vinylidene-series resin (e.g., a vinylidene chloride-series resin), an aromatic polyester-series resin (e.g., a polyalkylene arylate homopolyester such as a polyalkylene terephthalate, a polyalkylene naphthalate, etc., a copolyester containing not less than 80 mole % of an alkylene arylate unit, a liquid-crystalline aromatic polyester, etc.), and a polyamide-series resin (e.g., an aliphatic polyester having short-chain segments, such as nylon 46, nylon 6, nylon 66, etc.). The crystalline resin(s) may be used independently or in a combination of two or more species. The degree of crystallization of the crystalline resin (e.g., a crystalline polypropylene-series resin) is, for example, about 10 to 80%, preferably about 20 to 70%, and more preferably about 30 to 60%.

As the resin constituting the continuous phase, usually a highly transparent and highly heat-resistant resin is used. The preferred continuous phase-forming resin is a crystalline resin having high fluidity as a molten property. The combination of such a resin and a dispersed phase-forming resin contributes to a homogeneous (uniform) compounding with the dispersed phase. When a resin having a high melting point or glass transition point (particularly a crystalline resin having a high melting point, e.g., a resin having a melting or glass transition temperature of about 130 to 280° C., preferably about 140 to 270° C., and more preferably about 150 to 260° C.) is used as a continuous phase-forming resin, its high heat stability and good film-forming properties improve the drawing ratio in a melt-molding process (melt-film-forming process) and facilitate the film-formation in a melt-molding process (melt-film-forming process). Therefore, the orientation treatment (or monoaxial stretching treatment) to improve the anisotropic scattering characteristic can be carried out at a comparatively high temperature (e.g., about 130 to 150° C.), the processing can be conducted smoothly, and the dispersed phase can be orientated easily. Furthermore, the film is stable over a broad temperature range (e.g., a room temperature to about 80° C.) so that the film can be utilized as a component part of a display apparatus or device (liquid crystalline display apparatus or device) with advantage. In addition, crystalline resins (e.g., a crystalline polypropylene resin) are generally low in price. The preferred crystalline resin includes a crystalline polypropylene-series resin which is inexpensive and has high heat stability.

As the noncrystalline resin, there may be mentioned, for example, a vinyl-series polymer (a homo- or copolymer of a vinyl-series monomer such as an ionomer, an ethylene-vinyl acetate copolymer, an ethylene-(meth)acrylic ester copolymer, a polyvinyl chloride, a vinyl chloride-vinyl acetate copolymer, a poly(vinyl acetate), a vinyl alcohol-series resin, etc.), a (meth)acrylic resin (e.g., a poly(methyl methacrylate), a methyl methacrylate-styrene copolymer (MS resin), etc.), a styrenic resin (a polystyrene, an AS resin, a styrene-methyl methacrylate copolymer, etc.), a polycarbonate-series polymer, a noncrystalline polyester-series resin (an aliphatic polyester, a polyalkylene arylate copolyester whose diol component and/or aromatic dicarboxylic acid component is partially substituted, a polyarylate resin, etc.), a polyamide-series resin (e.g., an aliphatic polyamide having a long-chain segment and a noncrystalline aromatic polyamide), and a thermoplastic elastomer (e.g., a polyester elastomer, a polyolefin elastomer, a polyamide elastomer, a styrenic elastomer). Referring to the noncrystalline polyester-series resin, the polyalkylene arylate copolyester includes a copolyester obtainable from at least one member selected from a (poly)oxyalkylene glycol (e.g., diethylene glycol, triethylene glycol), cyclohexanedimethanol, phthalic acid, isophthalic acid and an aliphatic dicarboxylic acid (e.g., adipic acid) as part (e.g., about 10 to 80 mole %, preferably about 20 to 80 mole %, and more preferably about 30 to 75 mole %) of the diol component (a $C_{2-4}$alkylene glycol) and/or aromatic dicarboxylic acid component (terephthalic acid, naphthalenedicarboxylic acid). The noncrystalline resin may be used independently or in a combination of two or more species.

As the resin constituting the dispersed phase, a resin being highly transparent, deforming easily at an orientation-treating temperature such as a monoaxial stretching temperature and having practical heat-stability is usually employed. In particular, when a resin having a lower melting point or glass transition temperature (or point) than the continuous phase is used as the resin constituting the dispersed phase, the aspect ratio of dispersed phase particles can be easily increased by an orientation treatment such as monoaxial stretching. Incidentally, the melting point or glass transition temperature of the dispersed phase-forming resin is lower than that of the resin constituting the continuous phase in many instances, and may for example be about 50 to 180° C., preferably about 60 to 170° C., and more preferably about 70 to 150° C.

Among the noncrystalline resins constituting the dispersed phase, at least one resin selected from a noncrystalline copolyester-series resin and a polystyrenic resin is preferred. When the noncrystalline copolyester is used to form the dispersed phase, a high degree of transparency can be assured and the glass transition temperature can, for example, be about 80° C. so that the dispersed phase can be easily deformed at the temperature used for orientation treatment such as monoaxial stretching and the dispersed phase can be kept stable over a given temperature range (for example, room temperature to about 80° C.) after molding. Moreover, the noncrystalline copolyester [e.g., a polyethylene terephthalate copolyester obtainable by using a diol component such as ethyleneglycol/cyclohexanedimethanol= about 10/90 to 60/40 (mole %), particularly about 25/75 to 50/50 (mole %), or a copolyester obtainable by using a diol component such as 9,9-bis(4-(2-hydroxyethoxy)phenyl) fluorene having a fluorenone side chain] has a high index of refraction (e.g., about 1.57), in addition, the noncrystalline copolymer may be compounded with the crystalline resin (such as polypropylene-series resin) in relatively good condition.

Since the polystyrenic resin has the high refractive index and the high transparency, and has such a high glass transition temperature as about 100 to 130° C., an anisotropic scattering sheet having excellent heat-resistance can be prepared by using the resin. Moreover, the preferred anisotropic scattering sheet can be prepared by using an inexpensive polystyrenic resin at a comparatively small amount relative to the crystalline resin as the continuous phase (e.g., polypropylene-series resin), in addition, at comparatively low drawing ratio. Furthermore, the sheet shows extremely high anisotropy in the case of being subjected to calendering after melt molding.

To provide the film with light-diffusing properties, the continuous phase and the dispersed phase (discontinuous phase or dispersoid) are constituted of components differing from each other in refractive index. The refractive index difference between the continuous phase and the dispersed phase may, for example, be not less than 0.001 (e.g., about 0.001 to 0.3), preferably about 0.01 to 0.3, and more preferably about 0.01 to 0.1.

As the combination of such resins, the following combinations may be mentioned by way of example:
(1) the combination of an olefinic resin (particularly a propylene-series resin) with at least one member selected from the group consisting of an acrylic resin, a styrenic resin, a polyester-series resin, a polyamide-series resin and a polycarbonate-series resin, (2) the combination of a styrenic resin with at least one member selected from the group consisting of a polyester-series resin, a polyamide-series resin and a polycarbonate-series resin, and (3) the combination of a polyester-series resin with at least one member selected from the group consisting of a polyamide-series resin and a polycarbonate-series resin.

As the preferred combination of a crystalline resin constituting the continuous phase with a noncrystalline resin constituting the dispersed phase, for example, there may be mentioned a combination of a crystalline polyolefinic resin (e.g., a crystalline polypropylene resin) with at least one resin selected from a noncrystalline polyester (e.g., a polyalkylene arylate copolyester such as a polyalkylene terephthalate copolyester) and a polystyrenic resin.

In the light-diffusing layer, the ratio of the continuous phase relative to the dispersed phase can be judiciously selected from the range of, for example, [former/latter (by weight)]=about 99/1 to 30/70 (e.g., about 95/5 to 40/60), preferably about 99/1 to 50/50 (e.g., about 95/5 to 50/50), and more preferably about 99/1 to 75/25, with reference to the kinds, melt viscosity, light diffusing properties and the like of the resins.

The light-diffusing film may contain a compatibilizing agent if necessary. With a compatibilizing agent, the miscibility and mutual affinity of the continuous phase and the dispersed phase can be improved, the formation of defects (voids and other defects) of the film can be prevented even in orientation treatment, and the deterioration of transparency of the film can be prevented. Furthermore, the adhesion between the continuous phase and the dispersed phase can be enhanced so that even when the film is stretched monoaxially, the adhesion of the dispersed phase on the stretching equipment can be decreased.

The compatibilizing agent may be selected from the conventional compatibilizing agents according to the species of the continuous phase and the dispersed phase and, for example, an oxazoline compound, a modified resin as modified with a modifying group (carboxyl, acid anhydride, epoxy, oxazolinyl and other groups), a diene or rubber-containing polymer [e.g., a diene-series copolymer (such as a random copolymer) obtainable by copolymerization of a diene-series monomer alone or of a diene-series monomer and a copolymerizable monomer (such as an aromatic vinyl monomer); a diene-series graft copolymer such as an acrylonitrile-butadiene-styrene copolymer (ABS resin); a diene-series block copolymer such as a styrene-butadiene (SB) block copolymer, a hydrogenated styrene-butadiene (SB) block copolymer, a hydrogenated styrene-butadiene-styrene block copolymer (SEBS) and a hydrogenated (styrene-ethylene/butylene-styrene) block copolymer, or their hydrogenated compounds], and a diene or rubber-containing polymer modified with the modifying group(s) (epoxy and other groups). The compatibilizing agent(s) may be used independently or in a combination of two or more species.

As the compatibilizing agent, a polymer (a random, block or graft copolymer) having the same or common components with the polymer blend-series constituent resins, or a polymer (random, block or graft copolymers) having an affinity for the polymer blend-series constituent resins are usually employed.

The diene-series monomer includes conjugated dienes such as a $C_{4-20}$ conjugated diene which may be optionally substituted, e.g., butadiene, isoprene, 1,3-pentadiene, 2,3-dimethyl-1,3-butadiene, piperylene, 3-butyl-1,3-octadiene, and phenyl-1,3-butadiene. The conjugated diene may be used independently or in a combination of two or more species. Among these conjugated dienes, butadiene or isoprene is preferred. The aromatic vinyl monomer includes styrene, α-methylstyrene, a vinyltoluene (p-methylstyrene etc.), p-t-butylstyrene, and a divinylbenzene. Among these aromatic vinyl monomers, styrene is preferred. The monomer may be used independently or in a suitable combination of two or more species.

The modification mentioned above can be made by copolymerizing a monomer corresponding to the modifying group (e.g., a carboxyl group-containing monomer such as (meth)acrylic acid for carboxyl-modification, maleic anhydride for acid anhydride-modification, a (meth)acrylic monomer for ester-modification, a maleimide-series monomer for maleimide-modification, and an epoxy group-containing monomer such as glycidyl (meth)acrylate for epoxy-modification). The epoxy-modification may be made by epoxidization of an unsaturated double bond.

The preferred compatibilizing agent is an unmodified or modified diene-series copolymer, particularly a modified block copolymer (e.g., an epoxidized diene-series block copolymer or an epoxy-modified diene-series block copolymer such as an epoxidized styrene-butadiene-styrene (SBS) block copolymer). The epoxidized diene-series block copolymer is not only highly transparent but has a comparatively high softening point of about 70° C., and is capable of compatibilizing resins in many combinations of continuous and dispersed phases to disperse the dispersed phase uniformly.

The block copolymer mentioned above can be constituted of a conjugated diene block or the corresponding partially hydrogenated block and an aromatic vinyl block. In the epoxidized diene-series block copolymer, the double bonds in the conjugated diene blocks may have been partly or completely epoxidized. The ratio (weight ratio) of the aromatic vinyl block relative to the conjugated diene block (or the corresponding hydrogenated block) [former/latter] may for example be about 5/95 to 80/20 (e.g., about 25/75 to 80/20), more preferably about 10/90 to 70/30 (e.g., about 30/70 to 70/30), and usually about 50/50 to 80/20. Incidentally, the epoxidized block copolymer with an aromatic vinyl block (e.g., styrene block) in a content of about 60 to 80 weight % has a refractive index which is comparatively high (e.g., about 1.57) and close to the refractive index of the dispersoid resin (e.g., a noncrystalline copolyester) so that the dispersoid resin can be caused to be uniformly dispersed while the light scattering performance of the dispersoid resin is maintained.

The number average molecular weight of the block copolymer can be selected from the range of, for example, about 5,000 to 1,000,000, preferably about 7,000 to 900,000, and still more preferably about 10,000 to 800,000. The molecular weight distribution [the ratio [Mw/Mn] of weight average molecular weight (Mw) relative to number average molecular weight (Mn)] is, for example, not more than 10 (about 1 to 10), and preferably about 1 to 5.

The molecular structure of the block copolymer may be linear (straight), branched, radial or any combination thereof. The block structure of the block copolymer may for example be a monoblock structure, a multiblock structure such as a tereblock structure, a trichain-radial tereblock structure or a tetrachain-radial tereblock structure. Such block structures may for example be written as X—Y, X—Y—X, Y—X—Y, Y—X—Y—X, X—Y—X—Y, X—Y—X—Y—X, Y—X—Y—X—Y, (X—Y—)$_4$Si, (Y—X—)$_4$Si, etc. where X represents an aromatic diene block and Y represents a conjugated diene block.

The ratio of epoxy groups in the epoxidized diene-series block copolymer is not particularly restricted but, in terms of oxygen concentration of oxirane, may for example be about 0.1 to 8 weight %, preferably about 0.5 to 6 weight %, and more preferably about 1 to 5 weight %. The epoxy equivalent (JIS K7236) of the epoxidized block copolymer may for example be about 300 to 1,000, preferably about 500 to 900, more preferably about 600 to 800.

The refractive index of the compatibilizing agent (e.g., an epoxidized block copolymer) may be approximately the same as that of the dispersoid resin (for example, the difference in the refractive index between the dispersoid resin and the compatibilizing agent is about 0 to 0.01, and preferably about 0 to 0.005).

The above-mentioned epoxidized block copolymer can be produced by subjecting a diene-series block copolymer (or a partially hydrogenated block copolymer) to a conventional epoxidizing method, for example, a method comprising epoxidizing the block copolymer with the use of an epoxidizing agent (e.g., a peracid, a hydroperoxide) in an inactive solvent.

The amount (level) to be used of the compatibilizing agent may be selected from the range of, for example, about 0.1 to 20 weight %, preferably about 0.5 to 15 weight %, and more preferably about 1 to 10 weight %, based on the total resin composition.

In the preferred light-diffusing film, the relative amount of the continuous phase, dispersed phase and compatibilizing agent may for example be as follows:

(1) continuous phase/dispersed phase (weight ratio)=about 99/1 to 50/50, preferably about 98/2 to 60/40, more preferably about 90/10 to 60/40, and particularly about 80/20 to 60/40, (2) dispersed phase/compatibilizing agent (weight ratio)= about 99/1 to 50/50, preferably about 99/1 to 70/30, and more preferably about 98/2 to 80/20.

When the components are used in such ratios, the dispersed phase can be uniformly dispersed even if pellets of each component are directly melt-kneaded together without compounding the components in advance, the formation of voids is avoided on orientation treatment such as monoaxial stretching, and an ultraviolet absorbable light-diffusing film having high transmittance and anisotropy can be obtained.

More specifically, for example, the following resin composition can be compounded easily, and the melt-molding can be carried out with compounding the raw materials only by feeding them, and as a result, a light-diffusing film in which the formation of voids is prevented even in monoaxial stretching can be obtained:

(a) a resin composition comprising a crystalline polypropylene-series resin as the continuous phase, a noncrystalline copolyester-series resin as the dispersed phase, and an epoxidized SBS (styrene-butadiene-styrene block copolymer) as the compatibilizing agent, in which a ratio of the continuous phase relative to the dispersed phase is 99/1 to 50/50 (particularly, 80/20 to 60/40) (weight ratio) and a ratio of the dispersed phase relative to the compatibilizing agent is 99/1 to 50/50 (particularly, 98/2 to 80/20) (weight ratio);

(b) a resin composition comprising a crystalline polypropylene-series resin as the continuous phase, a polystyrenic resin as the dispersed phase, and an epoxidized SBS as the compatibilizing agent, in which a ratio of the continuous phase relative to the dispersed phase is 99/1 to 50/50 (particularly, 90/10 to 70/30) (weight ratio) and a ratio of the dispersed phase relative to the compatibilizing agent is 99/1 to 50/50 (particularly, 99.5/0.5 to 90/10) (weight ratio).

As the ultraviolet absorber (ultraviolet ray absorbing agent), for example, there may be mentioned a benzotriazole-series ultraviolet absorber [e.g., N-hydroxyphenylbenzotriazole, 2-(2'-hydroxy-5'-methylphenyl)benzotriazole, 2-(2'-hydroxy-5'-t-butylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3', 5'-di-t-amylphenyl)benzotriazole, 2-(2'-hydroxy-4'-octyloxyphenyl)benzotriazole, 2,2-methylenebis[4-(1,1,3,3-tetramethylbutyl)-6-(2H-benzotriazole-2-yl)phenol], [2-(2'-hydroxy-5'-methacryloxyphenyl)-2H-benzotriazole]], a benzophenone-series ultraviolet absorber [e.g., 2-hydroxybenzophenone, 2,4-dihydroxybenzophenone, a 2-hydroxy-4-alkoxybenzophenone (e.g., 2-hydroxy-4-methoxybenzophenone, 2-hydroxy-4-octyloxybenzophenone, 2-hydroxy-4-dodecyloxybenzophenone, bis(2-methoxy-4-hydroxy-5-sulfobenzophenone), 2-hydroxy-4-methoxy-5-sulfobenzophenone), 2,2'-dihydroxy-4,4'-dimethoxybenzophenone, bis(2-methoxy-4-hydroxy-5-benzoylphenylmethane)], a benzoate-series ultraviolet absorber [e.g., 2,4-di-t-butylphenyl-3,5-di-t-butyl-4-hydroxybenzoate], a salicylic acid-series ultraviolet absorber [e.g., phenyl salicylate, p-t-butylphenyl salicylate, p-octylphenyl salicylate], and a triazine-series ultraviolet absorber [e.g., 2-(4,6-diphenyl-1,3,5-triazine-2-yl)-5-hexyloxy-phenol]. The ultraviolet absorber(s) may be used singly or in combination. The preferred ultraviolet absorber is the benzotriazole-series ultraviolet absorber, and the benzophenone-series ultraviolet absorber.

The ultraviolet absorber may be selected according to the species of resin to be used, and a compound having compatibility or solubility to the resin is usually used. In the case where the light-diffusing layer contains an ultraviolet absorber, usually, the agent is dissolved or slightly dispersed in the continuous phase in the main.

The amount of the ultraviolet absorber relative to 100 parts by weight of the resin constituting the ultraviolet absorber-containing layer or the continuous phase may, for example, be selected within the range of about 0.1 to 10 parts by weight, and is usually about 0.1 to 5 parts by weight, preferably about 0.2 to 2.5 parts by weight, and more preferably about 0.5 to 2 parts by weight. The amount to be used of the ultraviolet absorber is usually selected within the range where the bleeding out does not occur.

Incidentally, the ultraviolet absorber may be used in combination with various stabilizers (e.g., an antioxidant, a heat stabilizer), in particular, a light stabilizer which inhibits degradation or deterioration of resins. The stabilizer includes an ultraviolet ray stabilizer (e.g., nickel bis (octylphenyl) sulfide, [2,2-thiobis(4-t-octylphenolate)]-n-butylamine nickel, nickel-dibutyldithiocarbamate), a hindered amine-series light stabilizer (e.g., [bis(2,2,6,6-tetramethyl-4-piperidyl) sebacate]), and others.

Further, an ultraviolet-absorbable fine particle (for example, an inorganic fine particle such as fine particulate zinc oxide and titanium oxide) may be used together within the range without deteriorating light-scattering properties or light transparency (e.g., such a small amount as 0.01 to 1% by weight) as far as the fine particle does not adversely affect light-scattering properties.

Furthermore, the light-diffusing film may contain conventional additive(s), for example, a plasticizer, an antistatic agent, a flame retardant and a filler.

For imparting the directionality to the light-diffusing film, the refractive index difference between the continuous phase resin and the dispersed phase particles may for example be about 0.005 to 0.2, preferably about 0.01 to 0.1, and the mean size of the major axes of the dispersed phase particles may for example be about 1 to 100 μm, preferably about 5 to 50 μm. The aspect ratio may for example be about 10 to 300 (e.g., 20 to 300) and preferably about 50 to 200, and may be about 40 to 300.

The thickness of the light-diffusing film is about 3 to 300 μm, preferably about 5 to 200 μm (e.g., about 30 to 200 μm), and more preferably about 5 to 100 μm (e.g., about 50 to 100 μm). Moreover, the total light transmittance of the light-diffusing film may, for example, be not less than 85% (about 85 to 100%), preferably not less than 90% (about 90 to 100%), and more preferably about 85 to 95% (e.g., about 90 to 95%). Further, the haze (haze value) value is not less than 50% (e.g., about 55 to 95%), preferably not less than 60% (e.g., 60 to 90%), more preferably about 70 to 90%, and particularly about 80 to 90%. In the case where the total light transmittance is small, the luminance tends to decrease, and in the case where the haze value is small, a light from the light guide cannot dispersed uniformly, as a result, the display quality level is deteriorated.

In the light-diffusing film having a laminated structure, the transparent resin constituting the transparent resin layer may be selected from the above-exemplified resins. The preferred transparent resin for enhancing heat resistance or blocking resistance includes a resin having heat resistance (e.g., a resin having high glass transition temperature or melting point), a crystalline resin and the like. The glass transition temperature or melting point of the resin constituting the transparent resin layer may be the same degree as that of the resin constituting the continuous phase, and may be, for example, about 130 to 280° C., preferably about 140 to 270° C., and more preferably about 150 to 260° C.

The thickness of the transparent resin layer may be similar to that of the light-diffusing film. For example, when the thickness of the light-scattering layer is about 3 to 300 μm, the thickness of the transparent resin layer may be selected from the range of about 3 to 150 μm. The thickness ratio of the light-diffusing layer relative to the transparent resin layer [the light-diffusing layer/the transparent resin layer] may, for example, be about 5/95 to 99/1, preferably about 50/50 to 99/1, and more preferably about 70/30 to 95/5. The thickness of the laminated film is, for example, about 6 to 600 μm, preferably about 10 to 400 μm, and more preferably about 20 to 250 μm.

On the surface of the light-diffusing film, the releasing agent such as silicone oil may be applied or the treatment by corona discharge may be given or applied, as far as the optical properties of the film is not deteriorated. Further, a light-diffusing film having anisotropy may be formed with irregularities (or concave-convex sites) extending along X-axial direction of the film (the major direction of the dispersed phase). The formation of such irregularities imparts a higher degree of anisotropy to the film.

[Process for Producing the Light-Diffusing Film]

The light-diffusing film having anisotropy can be obtained by dispersing and orienting a dispersed phase-forming component (resin component, fibrous component, etc.) in a continuous phase-forming resin. For example, the dispersoid component can be dispersed by the method which comprises blending the continuous phase-forming resin with the dispersoid-forming component (resin component, fibrous component, etc.) in the conventional manner (e.g., melt-blending method, tumbler method, etc.) where necessary, melt-mixing them, and extruding the molten mixture from a T-die, a ring die, or the like into a film form. Moreover, such a film can be produced by molding with the use of the conventional film-forming method, e.g., a coating method comprising applying a composition composed of a light-scattering component and a binder resin on a support film, a laminating method comprising laminating the above-mentioned composition, a casting method, and an extrusion molding method.

Moreover, a light-diffusing film having ultraviolet absorbability can be produced with a resin, a light-scattering component and an ultraviolet absorber in combination. For example, the film can be produced by a coating method comprising applying a composition composed of an ultraviolet absorber, a light-scattering component and a binder resin on a support film, an extrusion laminating method comprising laminating the above-mentioned composition, and others. The light-diffusing film having a monolayer structure can be produced by molding a resin composition composed of a resin, a light-scattering component and an ultraviolet absorber with the use of the conventional film-forming method such as a casting method and an extrusion molding method.

Incidentally, a light-diffusing film which has a laminated structure comprising a light-diffusing layer and a transparent (resin) layer laminated on at least one side of the light-diffusing layer can be formed by a co-extrusion molding method comprising co-extruding a resin composition composed of a component corresponding to the light-diffusing layer, and a resin composition composed of a component corresponding to the transparent resin layer to form a film; a method comprising laminating one layer on previously produced another layer with extruding lamination; a dry lamination method comprising laminating a produced light-diffusing layer and a produced transparent resin layer, and others. To impart ultraviolet absorbability to the film, a resin composition corresponding to the transparent resin layer preferably at least comprises an ultraviolet absorber.

Moreover, the orientation of the dispersed phase can be achieved by, for example, (1) the method comprising drafting (or drawing) the extruded sheet to form the sheet in the course of extrusion, (2) the method comprising stretching the extruded sheet monoaxially, or (3) a combination of the methods (1) and (2). The light-diffusing film having anisotropy can also be obtained by (4) the method which comprises mixing the above-mentioned components together in a solution and film-forming the mixture by a casting method.

The melting temperature is not lower than the melting points of the resin component (continuous phase resin, dispersed phase resin), for example about 150 to 290° C., and preferably about 200 to 260° C. The draw ratio (draft) may be for example about 2 to 40, preferably about 5 to 30, and more preferably about 7 to 20. The stretching factor (multiples) may for example be about 1.1 to 50 (e.g., about 3 to 50), and preferably about 1.5 to 30 (e.g., about 5 to 30).

When the drawing and stretching are conducted in combination, the draw ratio may for example be about 2 to 10, preferably about 2 to 5, and the stretching factor may for example be about 1.1 to 20 (e.g., about 2 to 20), and preferably about 1.5 to 10 (e.g., about 3 to 10).

To impart adequate anisotropy to the anisotropic light-diffusing film of the present invention, the film is preferably obtained by drafting (or drawing) the extruded sheet to form the sheet in the course of extrusion in melt-molding process.

The draw ratio (draft) is, for example, about 1.5 to 40, preferably about 2 to 10, more preferably about 3 to 7, usually about 1.5 to 6 (e. g., about 1.5 to 5), and particularly about 2 to 5.

In order to enhance the aspect ratio of the dispersed phase easily, the technologies include the method of subjecting the film (for example, a film-formed (extruded or cast) and cooled film) to monoaxial stretching. The method for monoaxial stretching is not particularly restricted but includes the method in which both ends of a solidified film are pulled in opposite directions (pull stretching), the method using two or more pairs of opposed rollers (2-roll sets) arranged serially (e.g., in a series of 2 pairs) wherein the film is passed over the rollers constituting each roll set by guiding it through the respective roll nips and stretched by driving the 2-roll set on the pay-out side at a speed higher than the speed of the 2-roll set on the feed side (inter-roll stretching), and the method in which the film is passed through the nip of a pair of opposed rollers and stretched under the roll pressure (roll calendering).

The preferred monoaxial stretching technology includes methods which facilitate the mass production of film, such as inter-roll stretching and roll-calendering. These methods are utilized as a first stretching step for producing a biaxial stretched film or a method for producing a phase film. In Particular, by roll calender method, not only a noncrystalline resin but also a crystalline resin can be easily stretched. Thus, when a resin sheet is stretched monoaxially, usually the trouble of "neck-in", the phenomenon of local reduction in the thickness and width of the film, tends to occur. On the contrary, in the roll calendering method, the trouble of "neck-in" can be prevented so that the film stretching operation is stabilized. Since there is no change (reduction) in film width before and after stretching and the film thickness in the transverse direction can be made uniform, the light-scattering characteristic can be uniformized in the transverse (width) direction of the film, the quality assurance of the product be maintained, and the useful rate (yield) of the film can be improved. Furthermore, the stretching factor can be freely selected from a broad range. In addition, in roll calendering method, wherein the film width can be maintained before and after stretching, the reciprocal of the rate of reduction in film thickness is approximately equal to the stretching factor.

The roll pressure for roll calendering may for example be about $1 \times 10^4$ to $1 \times 10^7$ N/m (about 0.01 to 10 t/cm), and preferably about $1 \times 10^5$ to $1 \times 10^7$ N/m (about 0.1 to 10 t/cm).

The stretching factor can be selected from a broad range and may for example be about 1.1 to 10, preferably about 1.3 to 5, and more preferably about 1.5 to 3. The roll calendering can be carried out at a thickness reduction rate (draft) of about 0.9 to 0.1, preferably about 0.77 to 0.2, more preferably about 0.67 to 0.33.

The stretching temperature may be not lower than the melting point or glass transition temperature (point) of the dispersoid resin (dispersed phase resin). Moreover, when a resin having a glass transition point or melting point higher than that of the dispersoid resin (for example, a resin having a Tg or melting point higher by about 5 to 200° C., preferably about 5 to 100° C.) is used as the continuous phase-forming resin and the film is monoaxially stretched while the dispersoid resin is melted or softened, the aspect ratio of the dispersed phase particles can be increased because the dispersoid resin is by far readily deformed as compared with the continuous phase resin so that a film having a particularly large anisotropy of light scattering can be obtained. The preferred stretching temperature may for example be about 100 to 200° C. (about 110 to 200° C.), and preferably about 110 to 180° C. (about 130 to 180° C.). The calender roll temperature, in the case where the continuous phase resin is a crystalline resin, may be below the melting point of the resin or in the neighborhood of the melting point and, in the case where the continuous phase resin is a noncrystalline resin, the calender roll temperature may be a temperature below the glass transition point and in the neighborhood of the glass transition point.

[Plane Light Source Device and Liquid Crystal Display Apparatus Using Light-Diffusing Film]

The light-diffusing film of the present invention can be utilized in various apparatuses (or devices) and units.

Figure 4:
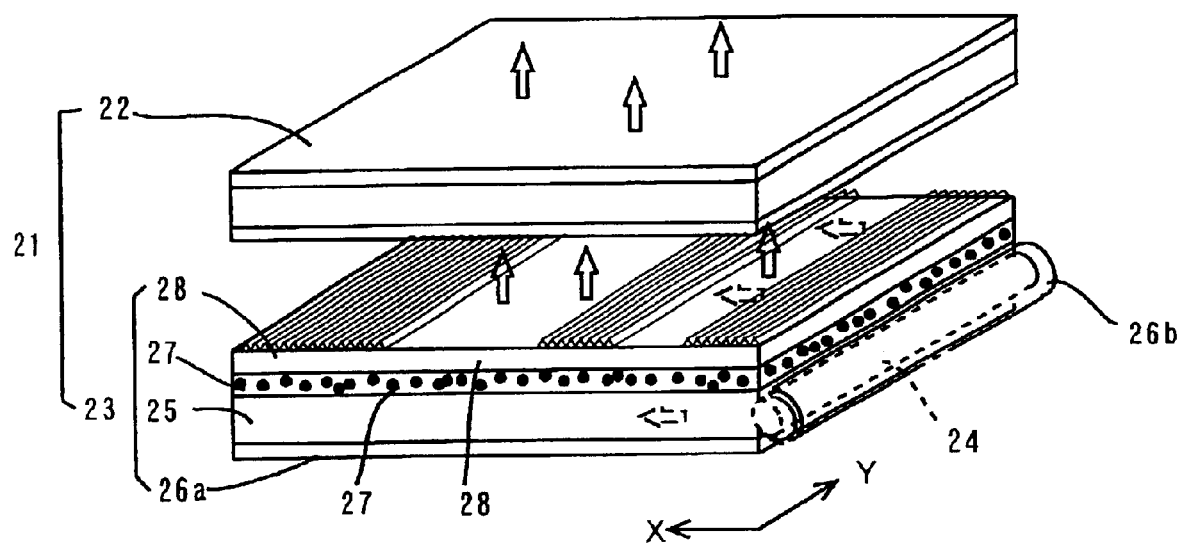
FIG. 4 is a schematic exploded perspective view showing an embodiment of a plane light source device and a transmissive liquid crystal display apparatus.

FIG. 4 is a schematic exploded perspective view showing an embodiment of a plane light source device and a transmissive liquid crystal display apparatus of the present invention.

In FIG. 4, the display apparatus 21 comprises a liquid crystal display unit (or liquid crystal display panel) 22 as an object to be irradiated, comprising a liquid crystal cell having a liquid crystal sealed therein, and a plane light source unit 23 disposed on the backside of the display unit (or panel) 22 for illuminating the display unit.

The plane light source unit 23 comprises a tubular light source 24 such as a fluorescent discharge tube (cold cathode tube), a translucent plate member, a light guide (light guide plate) 25 disposed adjacent to the tubular light source, a reflector 26b disposed outside of the tubular light source 24 for reflecting a light from the light source onto the lateral side of the light guide 25, and a reflecting member or reflecting layer 26a disposed on the backside of the light guide 25 for reflecting a light from the tubular light source 24 forward (or to the display unit side) and guiding the light to the display panel 22. The light from the tubular light source 24 emerges from a flat emerging surface through being incident from the lateral side of the light guide 25, and illuminates a display unit. However, in general, the luminance distribution of a light emerged from the tubular light source 24 is not uniform and the luminance distribution in the direction perpendicular to the axis-direction of the tubular light source 24 is not uniform. Thereby, even when a light is emerged from the emerging surface through (via) the light guide 25, it is impossible to illuminate the display unit 22 uniformly. Moreover, an ultraviolet ray generated from the tubular light source 24 leaks out with passing through the light guide (light guide plate) 25 and emerging from the emerging surface.

According to the present invention, therefore, a light-diffusing film 27, and a prism sheet 28 in which sectional triangular fine prisms are formed in parallel for a given direction, are arranged in that order on the emerging-surface side of the light guide 25 (light-emitting surface of the plane light source unit). Thereby, a light from the tubular light source 24 is uniformly diffused through the light-diffusing film 27 via the light guide 25, and focused frontward through the prism sheet 28, as a result, the luminance can be improved to illuminate the display unit 22 from the back or reverse side. In the case where the light-diffusing film 27 is an anisotropic light-diffusing film, even a single film ensures high anisotropic light-scattering properties. Accordingly, using a white scatterer composed of a fluorescent material is unnecessary, and the structure of a plane light source device and a liquid crystal display apparatus can be simplified. In the case where the light-diffusing film 27 is an ultraviolet ray absorbable film, the film makes visible light substantially free from an ultraviolet ray in a light from the tubular light source 24. The film accordingly can prevent yellow discoloration of a light guide, a diffusing sheet, a prism sheet (if necessary a sheet for improving luminance) and the like, and can inhibit changes of the color (hue) in a display surface of a liquid crystal display apparatus. Moreover, the ultraviolet ray absorbable film can inhibit deterioration of a polarizing plate which is usually applied on a surface of a liquid crystal display panel, and aggravation of a protecting film for the polarizing plate (such as a cellulose triacetate layer). The liquid crystal display panel is, therefore, capable of stably maintaining the display quality level over the long term. Further, even single film ensures high light-scattering properties and ultraviolet-blocking properties, thereby it is unnecessary to use a white scatterer composed of a fluorescent material. As a result, the structure of a plane light source device and a liquid crystal display apparatus can be simplified.

In the present invention, at least a light-diffusing film need only be disposed on the emerging surface side of the plane light source unit, and there is no necessity to use a prism sheet or a sheet for improving luminance in combination. The light-diffusing film, moreover, need only to be interposed between the plane light source unit and the display unit, and there is no necessity to laminate on the emerging surface of the plane light source unit.

The light-diffusing film, as described above, may comprise a monolayer structure, or a laminated structure. Further, various reflecting means, for example reflecting means comprising a wedge-shaped groove in addition to the reflecting layer, may be formed on the back or reverse side of the light guide (light guide plate).

Figure 5:
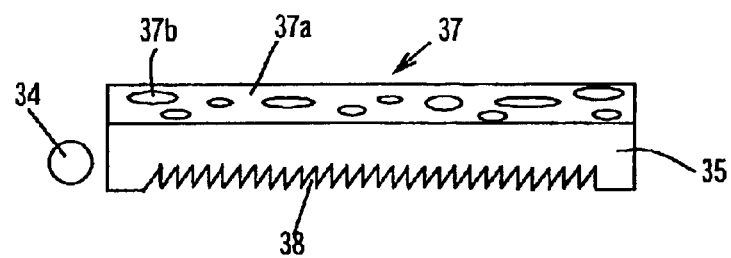
FIG. 5 is a schematic view showing another embodiment of the plane light source unit comprising the light-diffusing film.
Figure 6:
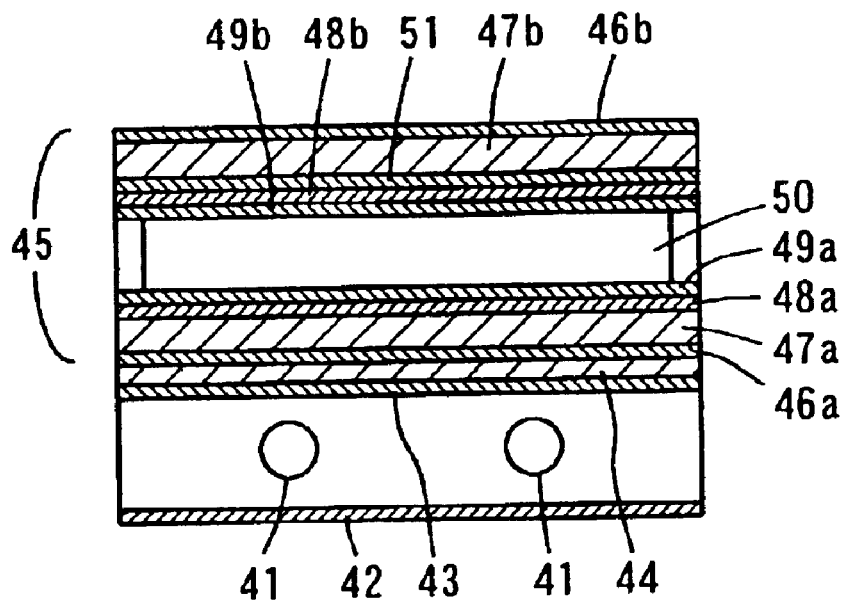
FIG. 6 is a schematic cross-section view showing a conventional transmissive liquid crystal display apparatus.
Figure 7:
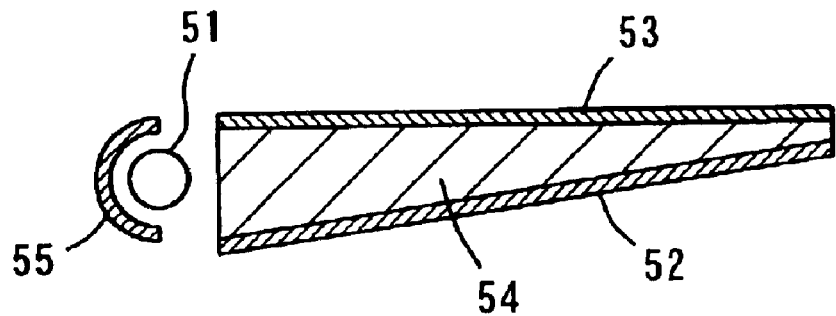
FIG. 7 is a schematic sectional view showing a backlight system of a transmissive liquid crystal display apparatus.

FIG. 5 is a schematic view showing another embodiment of the plane light source unit comprising the light-diffusing film. In this embodiment, the plane light source unit comprises a light guide (light guide plate) 35, a tubular light source 34 disposed adjacent to the lateral side of the light guide, a light-diffusing film 37, having a monolayer structure laminated or disposed on an emerging surface of the light guide 35, and a wedge-shaped reflecting groove (or reflecting concave-convex member) 38 formed on the back or reverse side of the light guide 35 for reflecting a light from the light source to a direction of a flat emerging surface with high directionality. The light-diffusing film may contain an ultraviolet absorber. Moreover, the light diffusing film 37 having a monolayer structure comprises a plurality of resins which are different from each other in refractive index, and the film has a phase separation structure (or an islands-in-an ocean structure) in which a dispersed phase particle 37b is dispersed in a continuous phase 37a.

The plane light source unit comprising the light guide 35 having the wedge-shaped reflecting groove 38, and the light diffusing film 37 realizes that a light from the light source is guided through the light guide 35 with a lateral side thereof disposed adjacent to the tubular light, and that the light guided by the light guide is reflected the guided light onto the emerging surface side by the wedge-shaped reflecting groove 38 formed at the bottom of the light guide 35 to emerge. That is, the light from the tubular light source is almost regularly reflected at a slope part of the wedge-shaped reflecting groove 38, and is emerged from the top surface of the light guide 35. The emerged light has high directionality due to a lot of components approximately perpendicular to the top surface of the light guide 35. Moreover, the emerged light (reflected light) from the light guide 35 can illuminate the display unit by moderately diffusing with an anisotropic diffusing film. There is, accordingly, no necessity to form a white scatterer on the back side of the light guide, and a plane light source unit need only comprises a light guide which can be simply and economically made by molding or the like and a light diffusing film laminated thereon, as a result the structure of the unit can be simplified. Further, use of the light guide and the light-diffusing film realizes improvement of anisotropic light-diffusing properties and light-condensing properties without the need of the above-mentioned prism sheet or reflecting layer, and the structure of the plane light source unit can be further simplified.

Incidentally, the X-axial direction of the anisotropic light-diffusing film 17 is usually the major axial direction of the dispersed phase 17b. The anisotropic light-diffusing film is, therefore, disposed in such manner that the X-axial direction thereof is almost perpendicular to the axial direction (Y-axial direction) of the tubular light source of the plane light source unit. It is unnecessary that the X-axial direction of the anisotropic light-diffusing film is perfectly perpendicular to the axial direction (Y-axial direction) of the tubular light source of the plane light source unit, and for example, the anisotropic light-diffusing film may be disposed in such manner that the X-axial direction thereof is oriented to the Y-axial direction of the tubular light source with a slope within an angle range of ±15°.

The transmissive display apparatus (particularly transmissive liquid crystal display apparatus) of the present invention comprises a display unit (such as a liquid crystal display unit) and the plane light source unit for illuminating the display unit. In the apparatus, an anisotropic light-diffusing film may be disposed toward various directions. Assuming that a horizontal direction of a display surface (liquid crystal display surface) from a viewer (or observer) is the Y-axis, the anisotropic light-diffusing film is preferably disposed in such manner that the Y-axis thereof (major light-scattering direction) is along the lines with or aligns with the Y-axis of the display surface. It is unnecessary that the Y-axial direction of the anisotropic light-diffusing film is perfectly perpendicular to the horizontal direction (Y-axial direction) of the display unit, and for example, the anisotropic light-diffusing film may be disposed in such manner that the Y-axial direction thereof is oriented to the horizontal direction of the display unit with a slope within an angle range of ±15°. When the anisotropic light-diffusing film is disposed in such a direction, the luminance distribution is uniformized and the angle dependence of the luminance relative to the display surface is reduced, thereby the luminance of the horizontal direction (lateral direction) is uniformized and TCO standard or the like is satisfied.

In the plane light source device, the light-diffusing film need only be disposed into light path emerged from the light-emitting (emerging) surface of the plane light source unit, that is in the light-emitting (emerging) side of the plane light source unit, if necessary may be disposed in the form laminated on the light-emitting (emerging) surface with the use of an adhesive, or may be disposed between the light-emitting (emerging) surface of the plane light source unit and the display unit. Moreover, the above-mentioned prism sheet is not always required, but it is useful for focusing a diffused light to illuminate the display unit. Even when the prism sheet is used in combination with the light-diffusing film, the position relationship between the anisotropic light-diffusing film and the prism sheet is not particularly limited. For example, the light-diffusing film may be disposed in the lower part or the upper part of light path than the prism sheet, and is usually disposed in the lower part of light path than the prism sheet.

INDUSTRIAL APPLICABILITY

The anisotropic light-diffusing film of the present invention ensures simplification of structures of a plane light source device and a display apparatus, and the film is useful for enhancing the luminance in the device and the apparatus. Moreover, a light guide plate having a wedge-shaped reflecting groove can be also improved the luminance and the visibility from the inclined direction. In particular, by combining the film with the wedge-shaped reflecting groove, even only one anisotropic light-diffusing film plays functions of both the light-diffusing sheet and the prism sheet (and if necessary a protecting sheet thereof), thereby reducing the number of the parts to be used and simplifying the structure, as well as enhancing the luminance and improving uniformity of luminance even viewing the display member from the horizontal direction. Further, although the plane light source device provides nonuniformity of the luminance in the vertical direction, the anisotropic light-diffusing film can inhibit dazzle by masking nonuniformity of the luminance even viewing the display member from the vertical direction, and as a result the level of display quality is improved. Moreover, by using a light-diffusing film having the ultraviolet absorbability, the level of display quality in a transmissive display apparatus (such as a transmissive liquid crystal display apparatus) can be stably kept up over the long term, and component parts thereof are effectively protected from an ultraviolet ray leaked from the light source. Moreover, in a backlight utilizing a wedge-shaped reflecting groove formed at the bottom of the light guide, the component parts (e.g., a diffusing film, a prism sheet, a sheet for improving luminance, a liquid crystal cell) are effectively protected from leaked ultraviolet ray without the white scatterer composed of a fluorescent material.

EXAMPLES

The following examples illustrate the present invention in further detail without defining the scope of the invention.

Incidentally, the characteristics of the light-diffusing film, the plane or flat light source device comprising (or using) the film, and the transmissive liquid crystal display apparatus comprising (or using) the film in the examples and comparative examples were evaluated by the following methods.
[Anisotropy]

Using the measuring system illustrated in FIG. 3, an intensity F of a scattered light at a scattering angle θ was measured. The orientating or stretching direction of the anisotropic scattering film was designated as X-axial direction and the direction perpendicular to this direction was designated as Y-axial direction. As an index of anisotropy, the value of $R(\theta)=Fy(\theta)/Fx(\theta)$ is shown in Tables 1 and 3.
[Light-Diffusing Property]

The haze (haze value) of the film was measured with an NDH-300A manufactured by Nippon Denshoku Industries Co., Ltd. The haze value is shown in Tables 1 and 3.
[Total Light Transmittance]

The total light transmittance was measured similar to the haze value measurement in accordance with JIS K 7105. The total light transmittance is shown in Table 1.
[Front-Luminance Ratio of Plane Light Source Device]

A plane light source device in which the bottom of the light guide was wedge-shaped was made, a film was disposed on an emerging surface of the light guide, and the luminance of the front side was measured with a luminance meter (manufactured by MINOLTA Co., Ltd., LS-110). The front luminance was evaluated by the luminance ratio relative to the luminance of Comparative Example 1 assuming that the luminance in Comparative Example 1 was qualified as 1. The resultant luminance ratio is shown in Table 2.

To evaluate the luminance uniformity in the horizontal direction of the display member concerning TCO standard, the angle dependence of the luminance was measured by rotating the plane light source device in the lateral direction (horizontal direction). That is, as shown in FIG. 3, the luminance meter was rotated at an angle of 18° and 40° relative to the film plane, and the luminance was measured at both angles. Referring to the luminance at rotating angles of 18° and 40° as N(18°) and N(40°), respectively, the ratio of N(18°) relative to N(40°) [N(18°)/N(40°)] is regarded as the evaluation value for TCO, and shown in Table 2. The closer the value is to 1, the more the device meets TCO standard.
[Level of Display Quality of Vertical Direction]

The display quality level of the display member when viewing from the vertical direction was visually judged in the basis of the following criteria. The results are shown in Table 2.

"A": almost uniform in the display

"B": slight dazzle was seen

"C": severe dazzle was seen
[Ultraviolet Absorbability]

The ultraviolet absorbability of the light-diffusing film was measured with a Spectrophotometer U-3300 (manufactured by Hitachi, Ltd.). The transmittance relative to an ultraviolet ray of wavelength 365 nm emitted from mercury is shown in Table 3.
[Accelerated Test of Ultraviolet Irradiation]

The accelerated test of ultraviolet irradiation was carried out with a Metalweather (manufactured by Daipla Wintes Co., Ltd.) at a temperature of 60° C., at an output power of 75 mW and for an irradiation time of 10 hours. In the test, the light-diffusing film was lapped on the prism sheet (manufactured by 3M, BEF III), and they were irradiated with an ultraviolet ray in such manner that the diffusing film serves as the irradiated surface. The color changes of both the light-diffusing film and the prism sheet (degrees of yellow discoloration) were visually evaluated on the basis of the following criteria.

"A": discoloration was hardly seen

"B": slight yellow discoloration was seen

"C": severe yellow discoloration was seen
[Leakage of Ultraviolet Ray from Plane Light Source Device]

A plane light source device in which the bottom of the light guide was wedge-shaped was made, a film was disposed on an emerging surface of the light guide, and the emission spectrum was measured with a PHOTAL7000 (manufactured by Otsuka Electronics Co., Ltd.) to examine the degree of leakage of an ultraviolet ray. Incidentally, in the plane light source device, an ultraviolet ray of wavelength 365 nm was emitted from the light guide. Additionally, when the film was disposed on the light guide, the degree of an ultraviolet ray to be masked relative to the emission intensity of an ultraviolet ray (365 nm) in the emission spectrum was evaluated in accordance with the following criteria.

"A": the degree of leakage was not more than 10%

"B": the degree of leakage was more than 10% and less than 30%

"C": the degree of leakage was not less than 30%

Example 1

The following resins were used: 90 parts by weight of a crystalline polypropylene-series resin PP (manufactured by Grand Polymer Co., F133, refractive index: 1.503) as the continuous phase resin; 9.5 parts by weight of a polystyrenic resin GPPS (general purpose polystyrenic resin, manufactured by Daicel Chemical Industries, Ltd., GPPS#30, refractive index: 1.589) as the dispersed phase resin; and 0.5 part by weight of an epoxidized diene-series block copolymer resin (manufactured by Daicel Chemical Industries, Ltd., Epofriend AT202; styrene/butadiene=70/30 (by weight), epoxy equivalent: 750, refractive index: about 1.57) as the compatibilizing agent.

The above continuous phase resin and dispersed phase resin were dried at 70° C. for about 4 hours, and these resins and the compatibilizing agent were kneaded in a Banbury mixer. Using an extruder, the resultant was melted at about 220° C. and extruded from a T-die with a draw ratio of about 3 onto a cooling or chilling drum having a surface temperature of 60° C. to obtain a film about 100 μm thick. Observation of the central part in the direction of the cross-section thickness with transmission electron microscopy (TEM) revealed that the dispersed phase in the central part was dispersed or distributed in the form of approximate sphere-like (suborbicular) (the aspect ratio of about 1.5 and the average particulate size of about 5 μm) and/or in the form of rugby ball-like configuration having a small aspect ratio.

Comparative Example 1

A commercially available diffusing sheet for light guide plate (manufactured by Tsujiden Co., Ltd., Light focusing type D121) was used as a comparative example.

Example 2

As components for the light-diffusing layer were used 85 parts by weight of a crystalline polypropylene-series resin PP (manufactured by Grand Polymer Co., F133, refractive index: 1.503) as the continuous phase resin; 14.5 parts by weight of a polystyrenic resin GPPS (general purpose polystyrenic resin, manufactured by Daicel Chemical Industries, Ltd., GPPS#30, refractive index: 1.589) as the dispersed phase resin; and 0.5 part by weight of an epoxidized diene-series block copolymer resin (manufactured by Daicel Chemical Industries, Ltd., Epofriend AT202; styrene/butadiene=70/30 (by weight), epoxy equivalent: 750, refractive index: about 1.57) as the compatibilizing agent. As a component for the transparent resin layer, the above crystalline polypropylene-series resin PP was used.

The above components for the light-diffusing layer and the component for the transparent resin layer were each dried at 70° C. for about 4 hours, and the components for the light-diffusing layer were kneaded in a Banbury mixer to prepare a resin composition for a light-diffusing layer. Using an extruder of multi-layered type, the resin composition for the light-diffusing layer and the resin used as the continuous phase resin (polypropylene-series resin) for forming a surface layer were melted at about 220° C., and extruded from a T-die with a draw ratio of about 3 onto a cooling or chilling drum having a surface temperature of 60° C. to laminate a surface layer (45 μm-thick) (a transparent resin layer) on both sides of the center layer (60 μm-thick) for obtaining a laminated sheet having three-layered structure (150 μm-thick).

Observation of the center layer being the light-diffusing layer with transmission electron microscopy (TEM) revealed that the dispersed phase in the center layer was dispersed or distributed in the form of approximate sphere-like (suborbicular) (the aspect ratio of about 1.4 and the average particulate size of about 6 μm) and/or in the form of rugby ball-like configuration having a small aspect ratio.

Example 3

A film was produced in the same manner as in Example 2 except that a noncrystalline copolyester-series resin was used instead of the dispersed phase resin. That is, the following resins were used: 80 parts by weight of a crystalline polypropylene-series resin PP (manufactured by Grand Polymer Co., F133, refractive index: 1.503) as the continuous phase resin; 19 parts by weight of a noncrystalline copolyester-series resin (PET-G, manufactured by Eastman Chemical Company, Eastar PETG GN071, refractive index: 1.567) as the dispersed phase resin; and 1 part by weight of an epoxidized diene-series block copolymer resin (manufactured by Daicel Chemical Industries, Ltd.; Epofriend AT202; styrene/butadiene=70/30 (by weight), epoxy equivalent: 750, refractive index: about 1.57) as the compatibilizing agent. For the surface layer (transparent resin layer), the same resin as the above continuous phase resin was employed.

As with Example 2, using an extruder of multi-layered type, these resins were melted at about 220° C., and extruded from a T-die with a draw ratio of about 3 onto a cooling or chilling drum having a surface temperature of 60° C. to laminate the surface layer (a transparent resin layer) (45 μm-thick) on both sides of the center layer (60 μm-thick) for obtaining a laminated sheet having three-layered structure (150 μm-thick).

Observation of the center layer (light-diffusing layer) with transmission electron microscopy (TEM) revealed that the dispersed phase in the center layer was dispersed or distributed in the form of rugby ball-like configuration (the aspect ratio of about 2.5 and the average particulate size of about 6 μm).

Comparative Example 2

Using an extruder of multi-layered type, the same resin composition for a diffusing layer and the same resin for a surfaced layer as those of Example 3 were melted at about 220° C. and extruded from a T-die with a draw ratio of about 12 onto a cooling or chilling drum having a surface temperature of 60° C. to laminate the surface layer (a transparent resin layer) (5 μm-thick) on both sides of the center layer (40 μm-thick) for obtaining a laminated sheet having three-layered structure (50 μm-thick). The resultant film had high anisotropy.

Example 4

As components for the light-diffusing layer of Example 2, a high molecular weight polystyrenic resin GPPS (general purpose polystyrenic resin, manufactured by Daicel Chemical Industries, Ltd., GPPS#40, refractive index: 1.589) was used in lieu of a polystyrenic resin GPPS (general purpose polystyrenic resin, manufactured by Daicel Chemical Industries, Ltd., GPPS#30, refractive index: 1.589) as the dispersed phase resin. In the same manner as in Example 2, using an extruder of multi-layered type, the resin composition for the light-diffusing layer and the continuous phase resin (polypropylene-series resin) for forming a surface layer were melted at about 220° C., and extruded from a T-die with a draw ratio of about 3 onto a cooling or chilling drum having a surface temperature of 60° C. to laminate the surface layer (a transparent resin layer) (45 μm-thick) on both sides of the center layer (60 μm-thick) for obtaining a laminated sheet having three-layered structure (150 μm-thick).

By observation of the center layer being the light-diffusing layer with transmission electron microscopy (TEM), the dispersed phase in the center layer was dispersed or distributed in the form of approximate sphere-like (suborbicular) (the aspect ratio of about 1.2 and the average particulate size of about 8 μm). The resultant film showed weak anisotropy.

Example 5

In analogy with Example 3, 70 parts by weight of a crystalline polypropylene-series resin PP (manufactured by Grand Polymer Co., F109BA, refractive index: 1.503) as the continuous phase resin; 28 parts by weight of a noncrystalline copolyester-series resin (PET-G, manufactured by Eastman Chemical Company, Eastar PETG GN071, refractive index: 1.567) as the dispersed phase resin; and 2 parts by weight of an epoxidized diene-series block copolymer resin (manufactured by Daicel Chemical Industries, Ltd., Epofriend AT202; styrene/butadiene=70/30 (by weight), epoxy equivalent: 750, refractive index: about 1.57) as the compatibilizing agent were used as the components for the light-diffusing layer. As the component for the transparent resin layer, a polypropylene-series copolymer resin (manufactured by Nippon Polychem Corp., FX-3) was used.

Using an extruder of multi-layered type, the components for the light-diffusing layer and the component for the transparent resin layer were melted at about 220° C. and about 190° C., respectively, and these components were converged to produce a multilayer by means of a T-die with a draw ratio of about 3 onto a cooling or chilling drum having a surface temperature of 60° C. to laminate the surface layer (a transparent resin layer) (45 μm-thick) on both sides of the center layer (60 μm-thick) for obtaining a laminated sheet having three-layered structure (150 μm-thick). The resultant film showed almost the same anisotropy as those of Example 3.

Comparative Example 3

In analogy with Example 5, 70 parts by weight of a crystalline polypropylene-series resin PP (manufactured by Grand Polymer Co., F109BA, refractive index: 1.503) as the continuous phase resin; 28 parts by weight of a noncrystalline copolyester-series resin (PET-G, manufactured by Eastman Chemical Company, Eastar PETG GN071, refractive index: 1.567) as the dispersed phase resin; and 2 parts by weight of an epoxidized diene-series block copolymer resin (manufactured by Daicel Chemical Industries, Ltd., Epofriend AT202; styrene/butadiene=70/30 (by weight), epoxy equivalent: 750, refractive index: about 1.57) as the compatibilizing agent were used as components for the light-diffusing layer. As a component for the transparent resin layer, a polypropylene-series copolymer resin (manufactured by Nippon Polychem Corp., FX-3) was used.

As with Example 5, the components for the light-diffusing layer and the component for the transparent resin layer were each dried at 70° C. for about 4 hours, and each kneaded in a Banbury mixer to prepare a resin composition for a light-diffusing layer and a resin composition for transparent resin for forming a surface layer. Using an extruder of multi-layered type, the resin composition for the light-diffusing layer and the resin composition for the transparent resin layer were melted at about 220° C. and about 190° C., respectively, and these compositions were converged to produce a multilayer by means of a T-die with a draw ratio of about 2 onto a cooling or chilling drum having a surface temperature of 60° C. to laminate the surface layer (a transparent resin layer) (90 μm-thick) on both sides of the center layer (120 μm-thick) for obtaining a laminated sheet having three-layered structure (300 μm-thick).

Observation of the center layer with transmission electron microscopy (TEM) revealed that the dispersed phase in the center layer was dispersed or distributed in the form of approximate sphere-like (suborbicular).

This sheet was monoaxially stretched by the roll calendering method [125° C., stretching factor of about 2 times (thickness reduction rate of about ½), and width reduction rate of about 3%] to obtain a film 150 μm thick. Observation of this film with TEM (dyeing with osmic acid) revealed that the dispersed phase of the light-diffusing layer was shaped like a highly elongated fiber, with a mean major axis size of about 30 μm, a mean minor axis size of about 1.5 μm, and an aspect ratio of the dispersed phase of 20.

Example 6

As components for the light-diffusing layer were used 85 parts by weight of a crystalline polypropylene-series resin PP (manufactured by Grand Polymer Co., F133, refractive index: 1.503) as the continuous phase resin; 14.5 parts by weight of a polystyrenic resin GPPS (general purpose polystyrenic resin, manufactured by Daicel Chemical Industries, Ltd., GPPS#40, refractive index: 1.589) as the dispersed phase resin; and 0.5 part by weight of an epoxidized diene-series block copolymer resin (manufactured by Daicel Chemical Industries, Ltd., Epofriend AT202; styrene/butadiene=70/30 (by weight), epoxy equivalent: 750, refractive index: about 1.57) as the compatibilizing agent. Moreover, as a component for the transparent resin layer, a polypropylene-series copolymer resin (manufactured by Nippon Polychem Corp., FX-3) was used.

Using an extruder of multi-layered type, the components for the light-diffusing layer and the component for the transparent resin layer were melted at about 220° C. and about 190° C., respectively, and these components were converged to produce a multilayer by means of a T-die with a draw ratio of about 3 onto a cooling or chilling drum having a surface temperature of 60° C. to laminate the surface layer (a transparent resin layer) (45 μm-thick) on both sides of the center layer (60 μm-thick) for obtaining a laminated sheet having three-layered structure (150 μm-thick). The resultant film showed about the same anisotropy as those of Example 2.

Comparative Example 4

A film was made in the same manner as in Example 6, and a laminated sheet having three-layered structure (180 μm-thick) was obtained by laminating 30 μm of the surface layer (transparent resin layer) on both sides of 120 μm of the center layer. The resultant film showed slightly stronger anisotropy than the film of Example 6, had large haze, and was deteriorated in the front luminance.

Comparative Example 5

A film was made in the same manner as in Example 6, and a laminated sheet having three-layered structure (150 μm-thick) was obtained by laminating the surface layer (transparent resin layer) (65 μm-thick) on both sides of the center layer (20 μm-thick). The resultant film showed slightly weaker anisotropy than the film of Example 6, had small haze, had prominent dazzle when viewing the display surface from the vertical direction, and deteriorated in the display quality level.

The results are shown in Tables 1 and 2.

TABLE 1

|  | Anisotropy R(4°) | Anisotropy R(18°) | Anisotropy R(30°) | Haze (%) | Total light transmittance (%) |
| --- | --- | --- | --- | --- | --- |
| Ex. 1 | 1.06 | 1.5 | 2.4 | 85 | 91 |
| Com. Ex. 1 | 1.02 | 1.04 | 1.06 | 86 | 70 |
| Ex. 2 | 1.02 | 1.4 | 2.0 | 84 | 91.5 |
| Ex. 3 | 1.4 | 3.8 | 6.5 | 83 | 91.7 |
| Com. Ex. 2 | 2.1 | 50 | 500 | 78 | 93 |
| Ex. 4 | 1.04 | 1.23 | 1.30 | 84 | 92.2 |
| Ex. 5 | 1.32 | 3.5 | 5.5 | 82 | 92.1 |
| Com. Ex. 3 | 15 | 500 | 5000 | 80 | 91 |
| Ex. 6 | 1.04 | 1.4 | 2.1 | 84 | 91.9 |
| Com. Ex. 4 | 1.05 | 1.6 | 2.8 | 93 | 90 |
| Com. Ex. 5 | 1.03 | 1.3 | 1.8 | 55 | 93 |

TABLE 2

|  | Front luminance ratio | N(18)/N(40) | Display quality level of vertical direction |
| --- | --- | --- | --- |
| Ex. 1 | 1.05 | 1.50 | A |
| Com. Ex. 1 | 1 | 1.84 | A |
| Ex. 2 | 1.06 | 1.60 | A |
| Ex. 3 | 1.16 | 1.40 | A |
| Com. Ex. 2 | 1.20 | 1.35 | B |
| Ex. 4 | 1.12 | 1.68 | A |
| Ex. 5 | 1.14 | 1.42 | A |
| Com. Ex. 3 | 1.08 | 1.22 | C |
| Ex. 6 | 1.09 | 1.61 | A |
| Com. Ex. 4 | 0.98 | 1.49 | A |
| Com. Ex. 5 | 1.18 | 1.65 | C |

Example 7

The following resins were used: 90 parts by weight of a crystalline polypropylene-series resin PP (manufactured by Grand Polymer Co., F133, refractive index: 1.503) as the continuous phase resin; 9 parts by weight of a polystyrenic resin GPPS (general purpose polystyrenic resin, manufactured by Daicel Chemical Industries, Ltd., GPPS#30, refractive index: 1.589) as the dispersed phase resin; and 0.5 part by weight of an epoxidized diene-series block copolymer resin (manufactured by Daicel Chemical Industries, Ltd., Epofriend AT202; styrene/butadiene=70/30 (by weight), epoxy equivalent: 750, refractive index: about 1.57) as the compatibilizing agent. In addition, 0.4 part by weight of a benzotriazole-series ultraviolet absorber (manufactured by Ciba Specialty Chemicals K.K., Tinuvin 234) and 0.1 part by weight of an aminotriazine-series light stabilizer (manufactured by Ciba Specialty Chemicals K.K., Chimassorb 944FD) were used.

The continuous phase resin, the dispersed phase resin, the ultraviolet absorber, and the light stabilizer were dried at 70° C. for about 4 hours, and these components were kneaded in a Banbury mixer, melted at about 240° C. with an extruder, and extruded from a T-die with a draw ratio of about 3 onto a cooling or chilling drum having a surface temperature of 25° C. to obtain a film about 100 μm thick. Observation of the central part in the direction of the cross section thickness with transmission electron microscopy (TEM) revealed that the dispersed phase in the central part was dispersed or distributed in the form of approximate sphere-like (suborbicular) (the aspect ratio of about 1.5 and the average particulate size of about 5 μm) and/or in the form of rugby ball-like configuration having a small aspect ratio.

Comparative Example 6

A commercially available diffusing sheet for light guide plate (manufactured by Reiko Co., Ltd., Ruirelight TRX100) was used as a comparative example.

Example 8

As components for the light-diffusing layer were used 85 parts by weight of a crystalline polypropylene-series resin PP (manufactured by Grand Polymer Co., F133, refractive index: 1.503) as the continuous phase resin; 14 parts by weight of a polystyrenic resin GPPS (general purpose polystyrenic resin, manufactured by Daicel Chemical Industries, Ltd., GPPS#30, refractive index: 1.589) as the dispersed phase resin; and 1 part by weight of an epoxidized diene-series block copolymer resin (manufactured by Daicel Chemical Industries, Ltd., Epofriend AT202; styrene/butadiene=70/30 (by weight), epoxy equivalent: 750, refractive index: about 1.57) as the compatibilizing agent. In addition, 99.5 parts by weight of the above-mentioned crystalline polypropylene-series resin PP, 0.4 part by weight of a benzotriazole-series ultraviolet absorber (manufactured by Ciba Specialty Chemicals K.K., "Tinuvin 234") and 0.1 part by weight of an aminotriazine-series light stabilizer (manufactured by Ciba Specialty Chemicals K.K., Chimassorb 944FD) were used as components for the transparent resin layer.

The components for the light-diffusing layer and the components for the transparent resin layer were each dried at 70° C. for 4 hours, and each kneaded in a Banbury mixer. The resultant resin composition for the light-diffusing layer and the resultant resin composition for the transparent resin layer were melted at about 240° C. with an extruder of multi-layered type, and extruded from a T-die with a draw ratio of about 3 onto a cooling or chilling drum having a surface temperature of 60° C. to obtain to laminate the surface layer (a transparent resin layer) (45 μm-thick) on both sides of the center layer (60 μm-thick) for obtaining a laminated sheet having three-layered structure (150 μm-thick).

Observation of the center light-diffusing layer with transmission electron microscopy (TEM) revealed that the dispersed phase in the center layer was dispersed or distributed in the form of approximate sphere-like (suborbicular) (the aspect ratio of about 1.4 and the average particulate size of about 6 μm) and/or in the form of rugby ball-like configuration having a small aspect ratio.

Comparative Example 7

Without ultraviolet absorbers, a light-diffusing film was prepared in the same manner as in Example 7. That is, 90 parts by weight of a crystalline polypropylene-series resin PP (manufactured by Grand Polymer Co., F133, refractive index: 1.503) as the continuous phase resin; 9 parts by weight of a polystyrenic resin GPPS (general purpose polystyrenic resin, manufactured by Daicel Chemical Industries, Ltd., GPPS#30, refractive index: 1.589) as the dispersed phase resin; 0.5 part by weight of an epoxidized diene-series block copolymer resin (manufactured by Daicel Chemical Industries, Ltd., Epofriend AT202; styrene/butadiene=70/30 (by weight), epoxy equivalent: 750, refractive index: about 1.57) as the compatibilizing agent; and 0.5 part by weight of an aminotriazine-series light stabilizer (manufactured by Ciba Specialty Chemicals K.K., "Chimassorb 944FD") were employed to make a light-diffusing film.

Example 9

To make a light-diffusing film in the same manner as in Example 7 were employed 80 parts by weight of a crystalline polypropylene-series resin PP (manufactured by Grand Polymer Co., F133, refractive index: 1.503) as the continuous phase resin; 18 parts by weight of a noncrystalline copolyester-series resin (PET-G, manufactured by Eastman Chemical Company, Eastar PETG GN071, refractive index: 1.567) as the dispersed phase resin; 1.3 parts by weight of an epoxidized diene-series block copolymer resin (manufactured by Daicel Chemical Industries, Ltd., Epofriend AT202; styrene/butadiene=70/30 (by weight), epoxy equivalent: 750, refractive index: about 1.57) as the compatibilizing agent; 0.2 part by weight of a benzotriazole-series ultraviolet absorber (manufactured by Ciba Specialty Chemicals K.K., Tinuvin 234) and 0.2 part by weight of an aminotriazine-series light stabilizer (manufactured by Ciba Specialty Chemicals K.K., "Chimassorb 944FD").

Comparative Example 8

A commercially available diffusing sheet for light guide plate (manufactured by Tsujiden Co., Ltd., Light focusing type D121) was used as a comparative example.

Example 10

As components for the light-diffusing layer were used 70 parts by weight of a crystalline polypropylene-series resin PP (manufactured by Grand Polymer Co., F109BA, refractive index: 1.503) as the continuous phase resin; 28 parts by weight of a noncrystalline copolyester-series resin (PET-G, manufactured by Eastman Chemical Company, Eastar PETG GN071, refractive index: 1.567) as the dispersed phase resin; and 2 parts by weight of an epoxidized diene-series block copolymer resin (manufactured by Daicel Chemical Industries, Ltd., Epofriend AT202; styrene/butadiene=70/30 (by weight), epoxy equivalent: 750, refractive index: about 1.57) as the compatibilizing agent.

As components for the transparent resin layer, 99.3 parts by weight of a polypropylene-series copolymer resin (manufactured by Nippon Polychem Corp., "FX-3") and 0.7 part by weight of a benzotriazole-series ultraviolet absorber (manufactured by Ciba Specialty Chemicals K.K., "Tinuvin 234") were used.

The components for the light-diffusing layer and the components for the transparent resin layer were each dried at 70° C. for about 4 hours, and each kneaded in a Banbury mixer to prepare a resin composition for a light-diffusing layer and a resin composition for a transparent resin layer which forms a surface layer. Using an extruder of multi-layered type, the resin compositions were melted at about 240° C., and extruded from a T-die with a draw ratio of about 3 onto a cooling or chilling drum having a surface temperature of 25° C. to laminate the surface layer (a transparent resin layer) (75 μm-thick) on both sides of the light-diffusing layer (150 μm-thick) for obtaining a laminated sheet having three-layered structure (300 μm-thick).

Observation of the center layer with transmission electron microscopy (TEM) revealed that the dispersed phase in the center layer was dispersed or distributed in the form of approximate sphere-like (suborbicular).

This sheet was monoaxially stretched by the roll calendering method [125° C., stretching factor of about 2 times (thickness reduction rate of about ½), and width reduction rate of about 3%] to obtain a film 150 μm thick. Observation of this film with TEM (dyeing with osmic acid) revealed that the dispersed phase of the light-diffusing layer (1) was shaped like a highly elongated fiber, with a mean major axis size of about 30 μm, and a mean minor axis size of about 1.5 μm.

The results are shown in Tables 3 and 4.

TABLE 3

| | Ultraviolet transmittance (%) | Haze (%) | Anisotropy R(18°) |
|---|---|---|---|
| Ex. 7 | 2 | 85 | 1.5 |
| Com. Ex. 6 | 50 | 87 | 1.05 |
| Ex. 8 | 3 | 84 | 1.4 |
| Com. Ex. 7 | 60 | 85 | 1.5 |
| Ex. 9 | 1 | 84 | 3.5 |
| Com. Ex. 8 | 40 | 86 | 1.04 |
| Ex. 10 | 1 | 84 | 400 |

TABLE 4

| | Ultraviolet irradiation test Diffusing sheet | Ultraviolet irradiation test Prism sheet | Leakage of ultraviolet ray from plane light source |
|---|---|---|---|
| Ex. 7 | A | A | A |
| Com. Ex. 6 | C | C | C |
| Ex. 8 | A | A | A |
| Com. Ex. 7 | C | C | C |
| Ex. 9 | A | A | A |
| Com. Ex. 8 | C | C | C |
| Ex. 10 | A | A | A |

What is claimed is:

1. A light-diffusing film capable of scattering an incident light in a light-advancing direction, wherein light-scattering characteristics $Fx(\theta)$ and $Fy(\theta)$ show a gradual decay pattern as a light-scattering angle $\theta$ becomes a wider angle, and a light-scattering characteristic $F(\theta)$ fulfills the following expressions representing the relationship between the light-scattering angle $\theta$ and a scattered light intensity F:

$$Fy(\theta)/Fx(\theta) \geq 1.01 \ (\theta=4 \text{ to } 30°) \text{ and}$$

$$1.1 \leq Fy(\theta)/Fx(\theta) \leq 20 \ (\theta=18°),$$

wherein $Fx(\theta)$ represents a light-scattering characteristic in an X-axial direction of the film and $Fy(\theta)$ represents a light-scattering characteristic in a Y-axial direction of the film.

2. A light-diffusing film according to claim 1, wherein the scattering characteristic $Fx(\theta)$ and scattering characteristic $Fy(\theta)$ fulfill the following expression:

$$1.01 \leq Fy(\theta)/Fx(\theta) \leq 100 \ (\theta=4 \text{ to } 30°).$$

3. A light-diffusing film according to claim 1, wherein the scattering characteristic $Fx(\theta)$ and scattering characteristic $Fy(\theta)$ fulfill the following expression:

$$1.1 \leq Fy(\theta)/Fx(\theta) \leq 500 \ (\theta=4 \text{ to } 30°).$$

4. A light-diffusing film according to claim 1, wherein the scattering characteristic $Fx(\theta)$ and scattering characteristic $Fy(\theta)$ fulfill the following expressions:

$$1.01 \leq Fy(\theta)/Fx(\theta) \leq 20 \ (\theta=4 \text{ to } 30°) \text{ and}$$

$$1.1 \leq Fy(\theta)/Fx(\theta) \leq 10 \ (\theta=18°).$$

5. A light-diffusing film according to claim 4, wherein the mean size of the minor axes of the dispersed phase particles is 0.1 to 10 μm, and the mean aspect ratio of the dispersed phase particles is 5 to 500.

6. A light-diffusing film according to claim 1, wherein the film is composed of a continuous phase and a dispersed phase particle which are different from each other in refractive index, and the mean aspect ratio of the dispersed phase particles is larger than 1 and the major axes of the dispersed phase particles are oriented in the X-axial direction being an oriented direction of the film.

7. A light-diffusing film according to claim 6, wherein both the continuous phase and the dispersed phase comprise a thermoplastic resin, and the weight ratio of the continuous phase relative to the dispersed phase [the continuous phase/the dispersed phase] is 99/1 to 50/50.

8. A light-diffusing film according to claim 6, wherein the continuous phase comprises a crystalline resin, and the dispersed phase comprises a noncrystalline resin.

9. A light-diffusing film according to claim 6, wherein the continuous phase comprises a crystalline polypropylene-series resin, and the dispersed phase comprises at least one resin selected from the group consisting of a noncrystalline copolyester-series resin and a polystyrenic resin.

10. A light-diffusing film according to claim 6, which further comprises a compatibilizing agent for the continuous phase and the dispersed phase.

11. A light-diffusing film according to claim 6, wherein the film comprises a crystalline polypropylene-series resin constituting the continuous phase, at least one resin constituting the dispersed phase, which is selected from the group consisting of a noncrystalline copolyester-series resin and a polystyrenic resin, and an epoxidized styrene-butadiene-styrene block copolymer constituting a compatibilizing agent; and the weight ratio of the continuous phase relative to the dispersed phase [the former/the latter] is 99/1 to 50/50, the weight ratio of the dispersed phase relative to the compatibilizing agent [the former/the latter] is 99/1 to 50/50, and the haze of the film is 80 to 90%.

12. A light-diffusing film according to claim 1, which comprises:

an anisotropic light-diffusing layer which anisotropically scatters a transmission light, and a transparent layer laminated on at least one side of the light-diffusing layer.

13. A light-diffusing film according to claim 1, which has a thickness of 3 to 300 μm, a total light transmittance of not less than 85%, and a haze of not less than 50%.

14. A light-diffusing film according to claim 1, which has a total light transmittance of not less than 90%, and a haze of not less than 60%.

15. A light-diffusing film according to claim 1, which has ultraviolet absorbability.

16. A light-diffusing film for disposing on a light-emitting side of a plane light source unit, wherein the film has ultraviolet absorbability; and wherein light-scattering characteristics $Fx(\theta)$ and $Fy(\theta)$ show gradual decay pattern as a light-scattering angle $\theta$ becomes a wider angle, and a light-scattering characteristic $F(\theta)$ fulfills the following expressions representing the relationship between the light-scattering angle $\theta$ and a scattered light intensity F:

$Fy(\theta)/Fx(\theta) \geq 1.01$ ($\theta$=4 to 30°) and $1.1 \leq Fy(\theta)/Fx(\theta) \leq 20$ ($\theta$=18°), wherein $Fx(\theta)$ represents a light-scattering characteristic in an X-axial direction of the film and $Fy(\theta)$ represents a light-scattering characteristic in a Y-axial direction of the film.

17. A light-diffusing film according to claim 16, wherein the film comprises a light-diffusing layer composed of a plurality of resins which are different from each other in refractive index, and a transparent layer laminated on at least one side of the light-diffusing layer; and at least the transparent layer contains an ultraviolet absorber.

18. A light-diffusing film according to claim 16, which shows an anisotropic light scatteration.

19. A light-diffusing film according to claim 16, wherein the scattering characteristic $Fx(\theta)$ and scattering characteristic $Fy(\theta)$ fulfill the following expression:

$1.1 \leq Fy(\theta)/Fx(\theta) \leq 500$ ($\theta$=4 to 30°).

20. A plane light source device, which comprises a plane light source unit composed of a light guide whose lateral side is disposed adjacent to a light source and which guides a light from the light source, a wedge-shaped reflecting groove formed at the bottom of the light guide for reflecting a light guided by the light guide to a light-emitting side, and a light-diffusing film disposed on a light-emitting side of the light guide capable of scattering an incident light in a light-advancing direction, wherein light-scattering characteristics $Fx(\theta)$ and $Fy(\theta)$ show a gradual decay pattern as a light-scattering angle $\theta$ becomes a wider angle, and a light-scattering characteristic $F(\theta)$ fulfills the following expressions representing the relationship between the light-scattering angle $\theta$ and a scattered light intensity F:

$Fy(\theta)/Fx(\theta) \geq 1.01$ ($\theta$=4 to 30°) and $1.1 \leq Fy(\theta)/Fx(\theta) \leq 20$ ($\theta$=18°), wherein $Fx(\theta)$ represents a light-scattering characteristic in an X-axial direction of the film and $Fy(\theta)$ represents a light-scattering characteristic in a Y-axial direction of the film.

21. A plane light source device according to claim 20, wherein the light-diffusing film comprises a light-diffusing layer and a transparent layer laminated on at least one side of the light-diffusing layer, and the transparent layer is disposed on a light-emitting side of the light guide of the plane light source unit.

22. A transmissive liquid crystal display apparatus comprising a display unit and a plane light source device recited in claim 20 disposed on the backside of the display unit for illuminating the display unit.

23. A transmissive liquid crystal display apparatus according to claim 22, wherein the display unit is a liquid crystal display unit which comprises a liquid crystal cell having a liquid crystal sealed therein.

24. A transmissive liquid crystal display apparatus according to claim 22, wherein, assuming that a horizontal direction of a liquid crystal display surface is a Y-axis, a light-diffusing film is disposed in such manner that a Y-axis perpendicular to the oriented direction of the light-diffusing film is parallel with the lines of the Y-axis of the liquid crystal display surface.

* * * * *